US010536046B2

(12) United States Patent
Teranishi et al.

(10) Patent No.: US 10,536,046 B2
(45) Date of Patent: Jan. 14, 2020

(54) ROTARY ELECTRIC MACHINE WITH STATOR HAVING BUS BARS WITH RECESSES AND BUS BAR HOLDER WITH PROTRUSIONS ENGAGED WITH THE RECESSES

(71) Applicant: AISIN SEIKI KABUSHIKI KAISHA, Kariya-shi, Aichi-ken (JP)

(72) Inventors: Hiroki Teranishi, Kariya (JP); Hideaki Kato, Aichi-ken (JP); Takashi Asaga, Toyota (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 649 days.

(21) Appl. No.: 15/245,484

(22) Filed: Aug. 24, 2016

(65) Prior Publication Data
US 2017/0093239 A1   Mar. 30, 2017

(30) Foreign Application Priority Data

Sep. 30, 2015 (JP) ................................. 2015-192868
Sep. 30, 2015 (JP) ................................. 2015-194949

(51) Int. Cl.
*H02K 3/28* (2006.01)
*H02K 1/14* (2006.01)
(Continued)

(52) U.S. Cl.
CPC ............. *H02K 3/28* (2013.01); *H02K 1/146* (2013.01); *H02K 1/2706* (2013.01); *H02K 3/18* (2013.01)

(58) Field of Classification Search
CPC ............ H02K 3/50; H02K 3/505; H02K 3/52; H02K 3/521; H02K 3/522; H02K 3/524;
(Continued)

(56) References Cited

U.S. PATENT DOCUMENTS 7,518,853 B2* 4/2009 Kato ..................... H02K 3/522
310/68 R
2007/0076354 A1* 4/2007 Kato ..................... H02K 3/522
361/637
(Continued)

FOREIGN PATENT DOCUMENTS

JP          09191588 A    7/1997
JP        2006115681 A    4/2006
(Continued)

OTHER PUBLICATIONS

Communication dated Jan. 11, 2017 from the European Patent Office in counterpart application No. 16191445.2.
(Continued)

*Primary Examiner* — Mang Tin Bik Lian
*Assistant Examiner* — Maged M Almawri
(74) *Attorney, Agent, or Firm* — Sughrue Mion, PLLC

(57) ABSTRACT

A rotary electric machine includes a rotor core fixed at a rotation axis, a stator core arranged facing the rotor core and including a plurality of teeth, a plurality of windings wound at the plurality of teeth of the stator core, a plurality of winding connection terminals connected to respective ends of the plurality of windings, a plurality of bus bars connected to the plurality of winding connection terminals, each of the plurality of bus bars being formed in either an arc form or an annular form, and a bus bar holder holding the plurality of bus bars in a laminated state and including a holder engagement portion engaging with a bus bar engagement portion which is provided at least at one of the plurality of bus bars.

7 Claims, 15 Drawing Sheets

(51) Int. Cl.
*H02K 1/27* (2006.01)
*H02K 3/18* (2006.01)

(58) Field of Classification Search
CPC ............ H02K 3/525; H02K 3/46; H02K 3/28; H02K 3/18; H02K 1/146; H02K 1/2706; H02K 2203/09
USPC ............................................ 310/71, 180–208
See application file for complete search history.

(56) References Cited

U.S. PATENT DOCUMENTS

2014/0028127 A1* 1/2014 Chamberlin ........... H02K 3/522
310/71
2014/0113472 A1* 4/2014 Chamberlin ............ H02K 3/50
439/212
2014/0183993 A1* 7/2014 Takasaki ................. H02K 3/50
310/71
2016/0190887 A1* 6/2016 Sambuichi ............. H02K 3/522
2016/0218578 A1* 7/2016 Yamada ................. H02K 3/522
2018/0316239 A1* 11/2018 Ogawa ................... H02K 11/30

FOREIGN PATENT DOCUMENTS

| JP | 2013-223322 A | 10/2013 |
|----|---------------|---------|
| JP | 2015070632 A  | 4/2015  |
| JP | 2015-97450 A  | 5/2015  |
| WO | 03/081755 A1  | 10/2003 |

OTHER PUBLICATIONS

Communication dated May 21, 2019, from the Japanese Patent Office in counterpart Application No. 2015-194949.
Communication dated Jun. 4, 2019, from the Japanese Patent Office in counterpart Application No. 2015-192868.

* cited by examiner

ROTARY ELECTRIC MACHINE WITH STATOR HAVING BUS BARS WITH RECESSES AND BUS BAR HOLDER WITH PROTRUSIONS ENGAGED WITH THE RECESSES

CROSS REFERENCE TO RELATED APPLICATIONS

This application is based on and claims priority under 35 U.S.C. § 119 to Japanese Patent Application 2015-194949, filed on Sep. 30, 2015 and Japanese Patent Application 2015-192868, filed on Sep. 30, 2015, the entire contents of which are incorporated herein by reference.

TECHNICAL FIELD

This disclosure generally relates to a rotary electric machine.

BACKGROUND DISCUSSION

A known rotary electric machine including plural bus bars is disclosed, for example, in JP2015-97450A which is hereinafter referred to as Reference 1. In addition, a known rotary electric machine including concentrated winding coils is disclosed, for example, in JP2013-223322A which is hereinafter referred to as Reference 2.

The rotary electric machine disclosed in Reference 1 includes a stator where plural stator pieces are annularly disposed in a circumferential direction relative to an axis of the stator and a rotor disposed coaxially with the stator and facing the stator. The stator pieces are constituted by plural split cores including projecting teeth at which phase coils (windings) are wound respectively, the phase coils corresponding to W-phase coils, V-phase coils and U-phase coils. The stator includes the plural bus bars, specifically, a W-phase bus bar, a V-phase bus bar, a U-phase bus bar and a common bus bar, which supply an electric power to the corresponding phase coils and which are connected to the corresponding stator pieces for the respective phases so as to maintain an annular arrangement of the split cores. Each of the W-phase bus bar, the V-phase bus bar, the U-phase bus bar and the common bus bar is formed in an annular plate. The W-phase bus bar, the V-phase bus bar and the U-phase bus bar are disposed at positions corresponding to the W-phase coils, the V-phase coils and the U-phase coils, respectively.

The rotary electric machine disclosed in Reference 2 includes a stator core including twelve teeth. The concentrated winding coils are constituted as three-phase alternating current windings in a state where the four concentrated winding coils are connected in parallel to one another for each phase. The concentrated winding coil wound at each of the teeth includes a coil terminal at each of a winding start portion and a winding end portion. That is, the two coil terminals are provided at each of the teeth. As a result, the twenty-four coil terminals in total are provided at the rotary electric machine. In addition, the rotary electric machine includes three bus bars each of which includes four coil connection terminals and one bus bar for a neutral point connection including twelve coil connection terminals. In the rotary electric machine disclosed in Reference 2, the coil terminals of the concentrated winding coils and the coil connection terminals of the bus bars are connected by welding to thereby achieve a Y-connection of the concentrated winding coils.

According to the rotary electric machine disclosed in Reference 1, in a case where each of the bus bars is assembled on the stator, the bus bar may be assembled in a wrong phase (wrong rotation direction position), which may lead to a connection failure between the bus bar and the phase coils. According to the rotary electric machine disclosed in Reference 2, the coil terminals (terminal members) are provided at the winding start portion and the winding end portion of each of the concentrated winding coils wound at the teeth. Thus, the two terminal members are necessary for each of the concentrated winding coils wound at the teeth. In a case of assembling the rotary electric machine, the number of welding for connecting the concentrated winding coils and the terminal members is required for the number of the terminal members. As a result, the number of welding (number of manufacturing processes) may be relatively large.

A need thus exists for a rotary electric machine which is not susceptible to the drawback mentioned above.

SUMMARY

According to a first aspect of this disclosure, a rotary electric machine includes a rotor core fixed at a rotation axis, a stator core arranged facing the rotor core and including a plurality of teeth, a plurality of windings wound at the plurality of teeth of the stator core, a plurality of winding connection terminals connected to respective ends of the plurality of windings, a plurality of bus bars connected to the plurality of winding connection terminals, each of the plurality of bus bars being formed in either an arc form or an annular form, and a bus bar holder holding the plurality of bus bars in a laminated state and including a holder engagement portion engaging with a bus bar engagement portion which is provided at least at one of the plurality of bus bars.

According to a second aspect of the disclosure, a rotary electric machine includes a rotor core, a stator core arranged facing the rotor core and including a plurality of teeth, a plurality of windings in which a three-phase voltage is induced and which is connected in a Y-connection, the plurality of windings being wound in a concentrated manner at the plurality of teeth of the stator core, a crossover wire portion connecting a winding start portion of one of the plurality of windings and a winding end portion of another one of the plurality of windings, and a terminal member connected to the crossover wire portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A first embodiment is explained with reference to the attached drawings. A motor 100 according to the first embodiment is explained with reference to FIGS. 1 to 10.

[Entire Construction of Motor]

Figure 1:
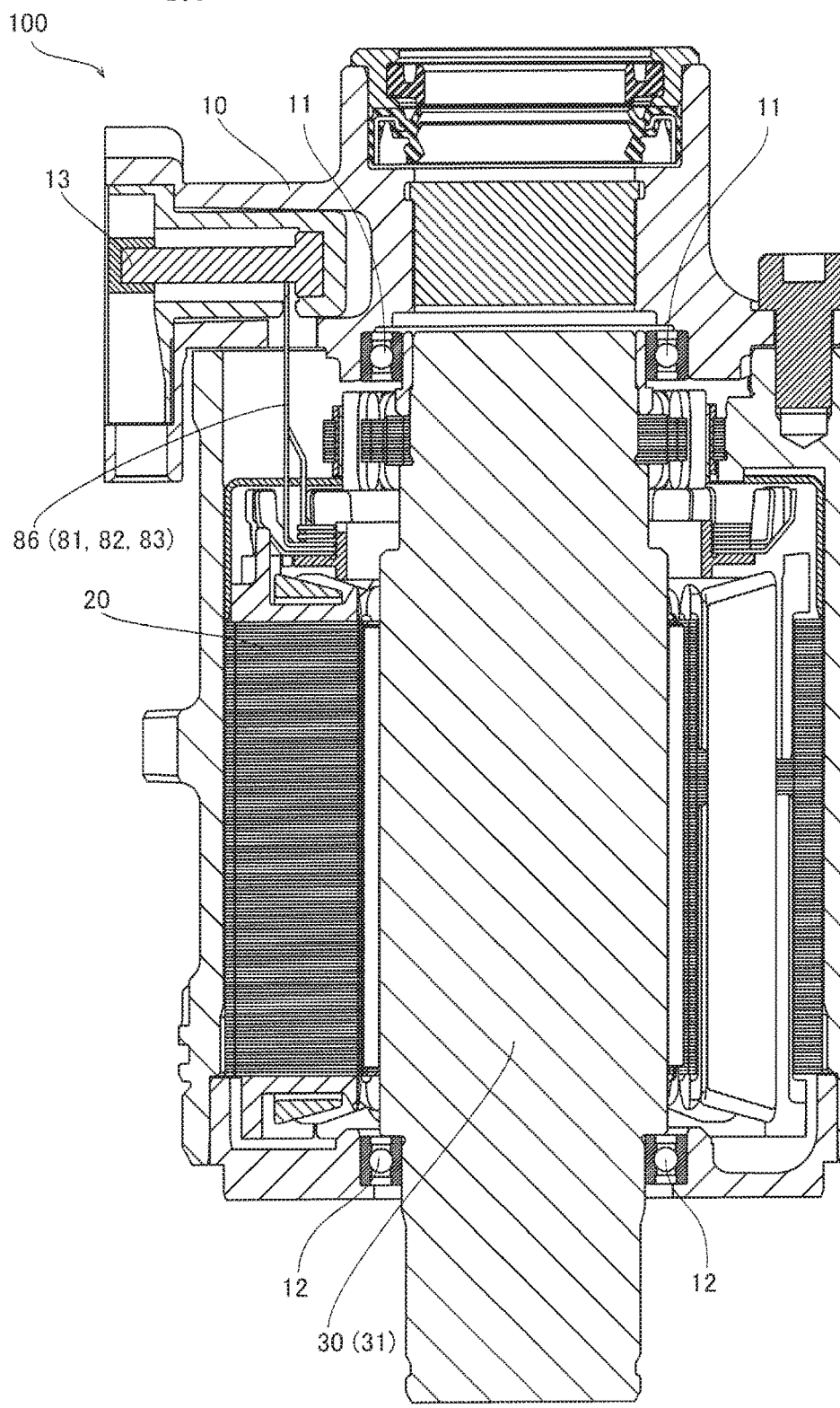
FIG. 1 is a cross-sectional view of a motor serving as a rotary electric machine according to first and second embodiments disclosed here.
Figure 1:
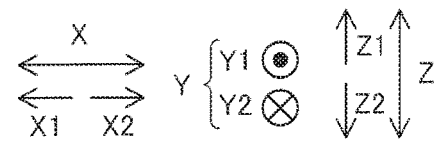

As illustrated in FIG. 1, the motor 100 serving as an example of a rotary electric machine is constituted as a brushless motor. The motor 100 includes a casing 10, a stator core 20 and a rotor core 30. The rotor core 30 is disposed at an inner side (i.e., a radially inner side) of the stator core 20 in an annular form so as to face the stator core 20. In the disclosure, a circumferential direction corresponds to a circumferential direction of the rotor core 30 or the stator core 20. In addition, a radial direction corresponds to a radial direction of the rotor core 30. Further, an axial direction corresponds to a rotation axis direction of the rotor core 30.

The casing 10 is provided to cover an outer peripheral surface of the stator core 20. The casing 10 includes bearings 11 and 12 so as to support a rotation axis of the rotor core 30 by the bearings 11 and 12. Three external connection terminals 13 each of which serves as an external terminal are provided at the casing 10. The external connection terminals 13 are supplied or applied with three-phase voltages, specifically, a U-phase voltage, a V-phase voltage and a W-phase voltage, respectively. In FIG. 1, one of the external connection terminals 13 is only illustrated. The three external connection terminals 13 are arranged along a direction in parallel to a Y-axis direction.

Figure 2:
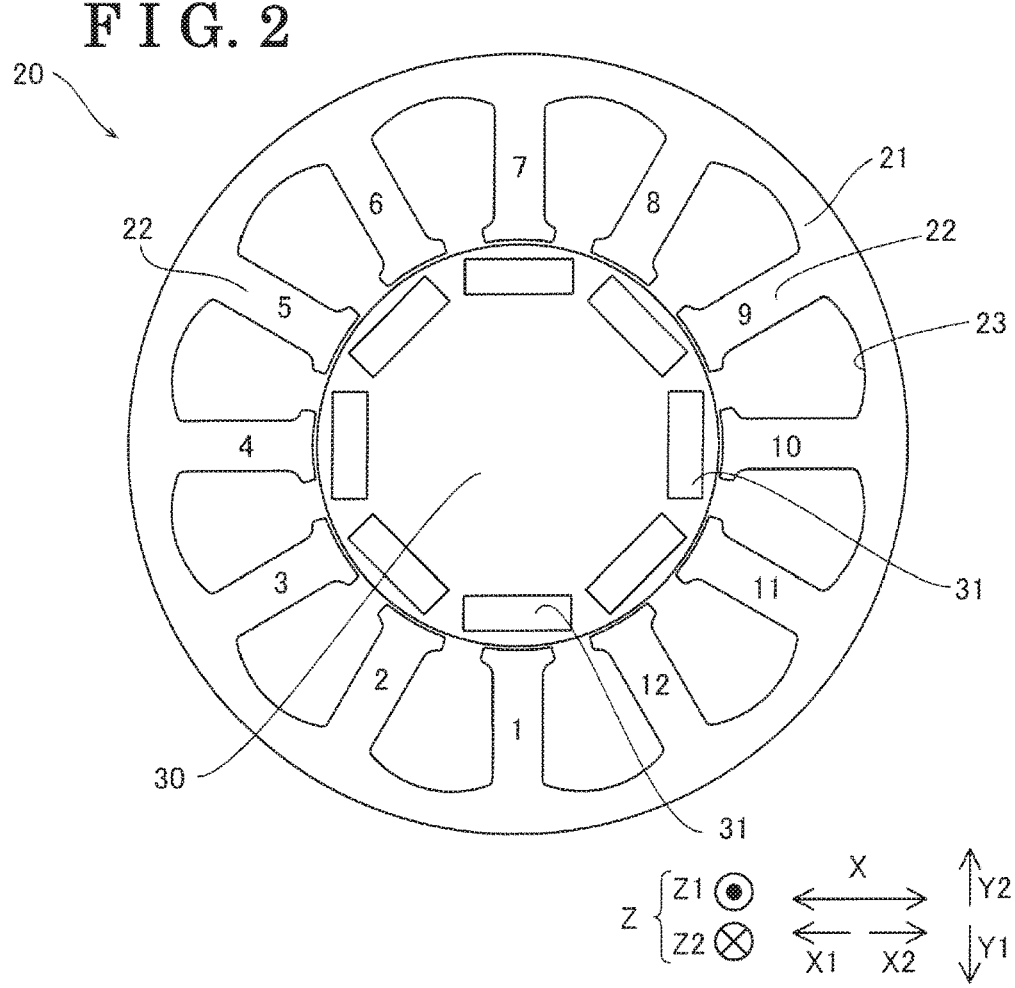
FIG. 2 is a plan view of a stator core and a rotor core of the motor when viewed in an axial direction according to the first and second embodiments.

As illustrated in FIG. 2, plural (for example, twelve) teeth 22 are provided at the stator core 20 so as to protrude from a back yoke 21 towards a radially inner side. In addition, slots 23 are provided at the stator core 20 in a manner where each of the slots 23 is disposed between the adjacent teeth 22. Windings 50 (see FIG. 3) are wound at the teeth 22 (slots 23) in a concentrated manner (i.e., the windings 50 serve as concentrated windings) via an insulator 40 (see FIGS. 4 and 5). In FIG. 2, for easy explanation, the twelve teeth 22 are assigned with different numbers 1 to 12.

Plural (for example, eight) permanent magnets 31 are embedded in the rotor core 30 at substantially equal angular intervals in the circumferential direction. Each of the permanent magnets 31 includes a substantially rectangular cross section when viewed in the axial direction. The motor 100 is configured as an 8-pole 12-slot motor accordingly.

[Winding Connection]

Figure 3:
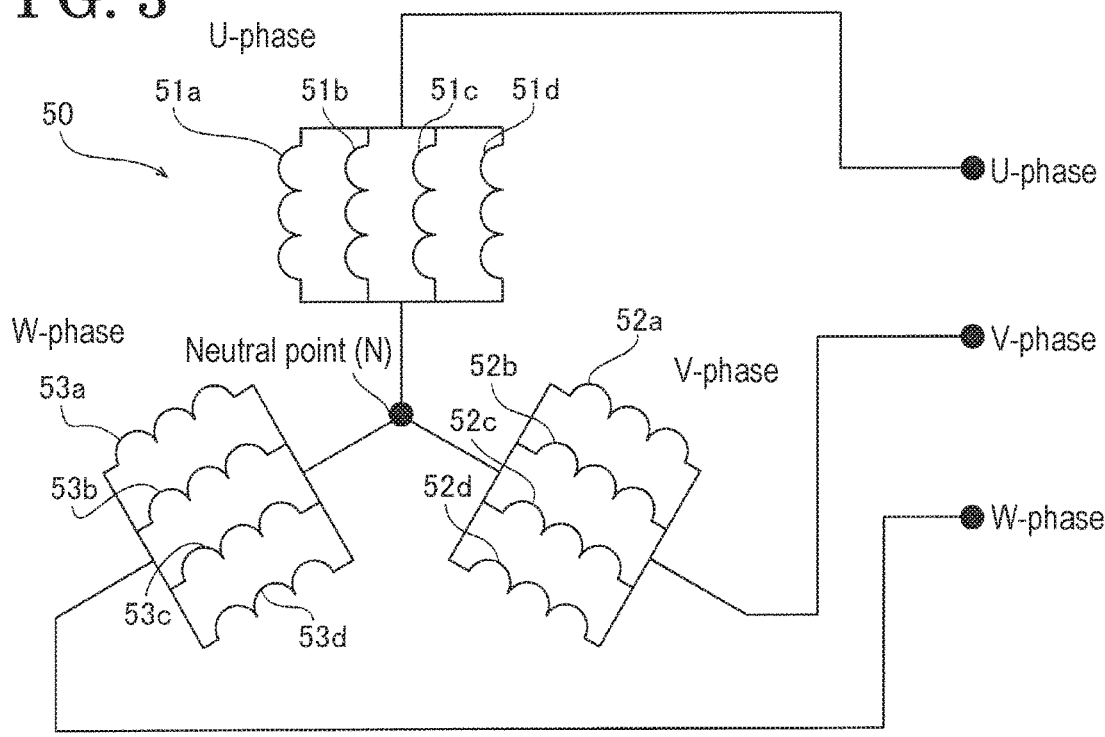
FIG. 3 is a circuit diagram for explaining a winding connection of the motor according to the first and second embodiments.

As illustrated in FIG. 3, the windings 50 include plural (for example, four) U-phase windings 51a, 51b, 51c and 51d serving as the same phase windings connected in parallel to one another, plural (for example, four) V-phase windings 52a, 52b, 52c and 52d serving as the same phase windings connected in parallel to one another, and plural (for example, four) W-phase windings 53a, 53b, 53c and 53d serving as the same phase windings connected in parallel to one another. First ends of the U-phase windings 51a, 51b, 51c and 51d, first ends of the V-phase windings 52a, 52b, 52c and 52d, and first ends of the W-phase windings 53a, 53b, 53c and 53d are applied or induced with corresponding voltages, i.e., the U-phase voltage, the V-phase voltage and the W-phase voltage, respectively. Second ends of the U-phase windings 51a, 51b, 51c and 51d, second ends of the V-phase windings 52a, 52b, 52c and 52d, and second ends of the W-phase windings 53a, 53b, 53c and 53d are connected to a neutral point (N). That is, the windings 50 are connected in a three-phase and four-parallel Y connection (star connection). In the following, the U-phase windings 51a, 51b, 51c and 51d, the V-phase windings 52a, 52b, 52c and 52d, and the W-phase windings 53a, 53b, 53c and 53d are simply described as the windings 50 in a case where the windings 51a to 51d, 52a to 52d and 53a to 53d are not specifically distinguished from one another.

Figure 4:
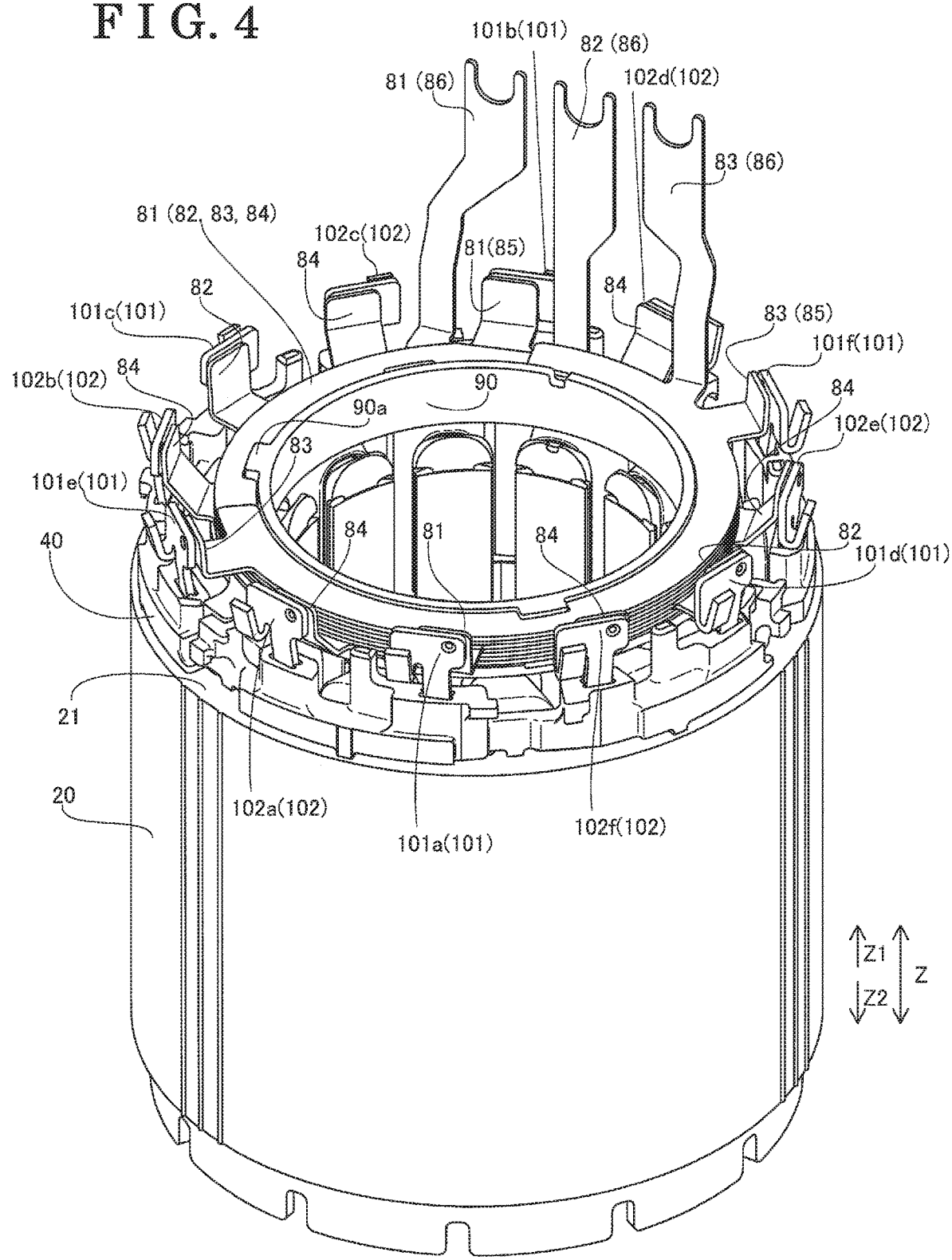
FIG. 4 is a perspective view for explaining an inside of the motor according to the first embodiment.

As illustrated in FIG. 4, the motor 100 includes power bus bars 81, 82 and 83. The power bus bars 81 to 83 are connected to power terminals 101 (i.e., power terminals 101a, 101b, 101c, 101d, 101e and 101f). Specifically, the power bus bar 82 is connected to the U-phase power terminals 101a and 101b. The power bus bar 83 is connected to the V-phase power terminals 101c and 101d. The power bus bar 81 is connected to the W-phase power terminals 101e and 101f. The power bus bars 81 to 83 are connected to the respective external connection terminals 13 (see FIG. 1). The motor 100 includes a neutral point bus bar 84. The neutral point bus bar 84 is connected to all neutral point terminals 102 (i.e., neutral point terminals 102a, 102b, 102c, 102d, 102e and 102f). Accordingly, the motor 100 is connected in the three-phase and four-parallel Y connection. The power bus bar 82 serves as an example of a first phase bus bar. The power bus bar 81 serves as an example of a second phase bus bar. The power bus bar 83 serves as an example of a third phase bus bar. The neutral point bus bar 84 serves as an example of a common bus bar. Each of the power terminal 101 and the neutral point terminal 102 serves as an example of a winding connection terminal. The power terminals 101 and the neutral point terminals 102 are connected to respective ends of the windings 50.

[Construction of Insulator]

Figure 5:
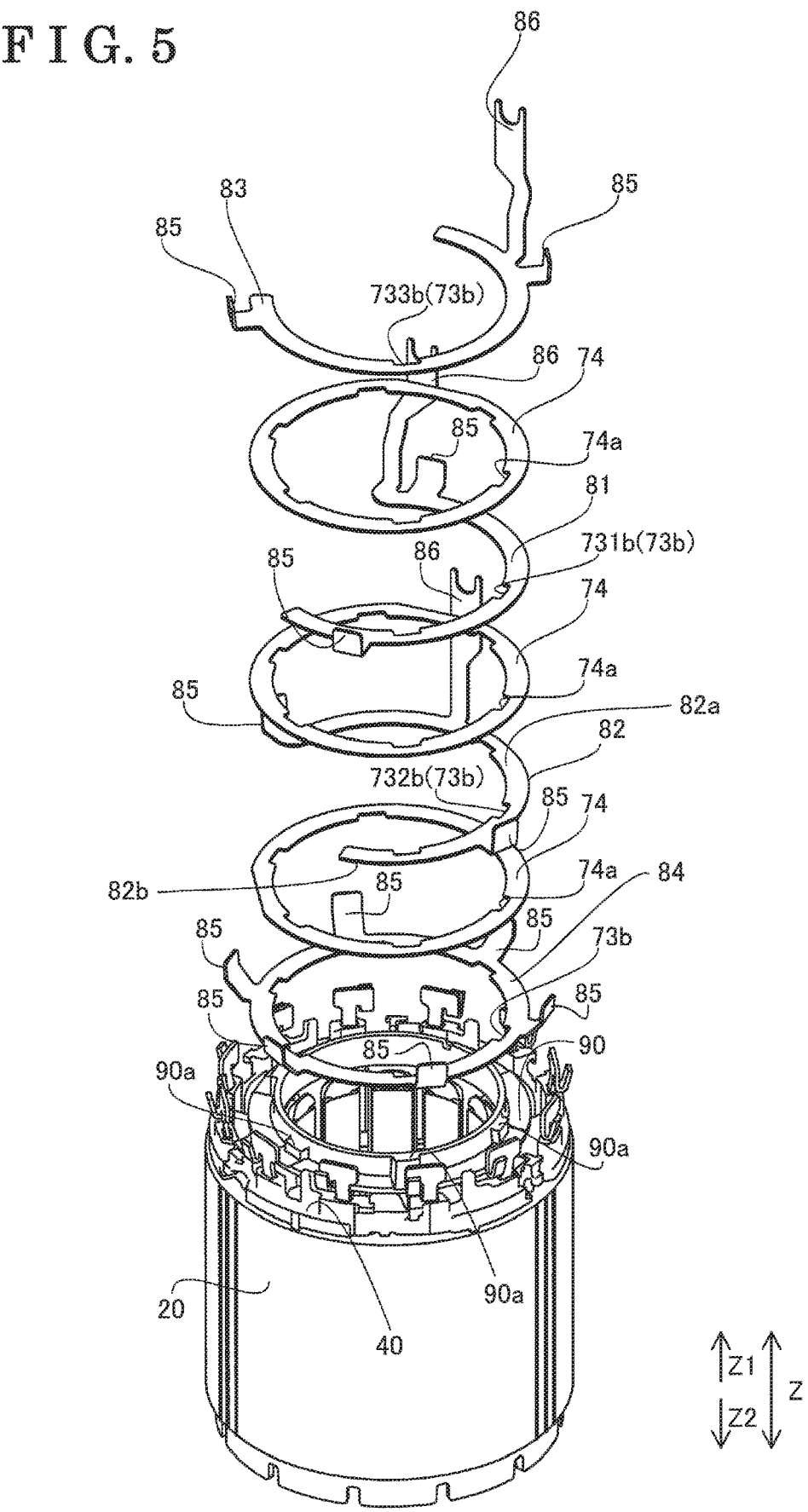
FIG. 5 is an exploded perspective view of the motor according to the first embodiment.

As illustrated in FIG. 5, the insulator 40 is provided to cover the plural teeth 22 of the stator core 20. The insulator 40 is configured to insulate between the stator core 20 and the plural windings 50.

[Construction of Bus Bar]

As illustrated in FIG. 5, the motor 100 includes a base portion 90 which is arranged at an axially upper side of the insulator 40 and which includes an annular configuration, and three insulation members 74 disposed between the power bus bars 81 to 83, respectively, in the axial direction. The base portion 90 serves as an example of a bus bar holder.

Specifically, the base portion 90 is made of resin, for example, including insulation properties. The base portion 90 is arranged at the axially upper side of a position at which the teeth 22 of the stator core 20 are provided and at the upper side of the insulator 40 at which the windings 50 are wound.

Each of the power bus bars 81 to 83 is formed in a thin plate and an arc form. The neutral point bus bar 84 is formed in a thin plate and an annular form.

The insulation members 74 are made of resin, for example, and are arranged between the neutral point bus bar 84, the power bus bars 81, 82 and 83, respectively, in the axial direction so as to insulate therebetween. The base portion 90, the neutral point bus bar 84, one of the three insulation members 74, the power bus bar 82, another one of the three insulation members 74, the power bus bar 81, still another one of the three insulation members 74 and the power bus bar 83 are assembled in the mentioned order from a lower side in the axial direction (i.e., assembled in an arrow Z1 direction).

Figure 6A:
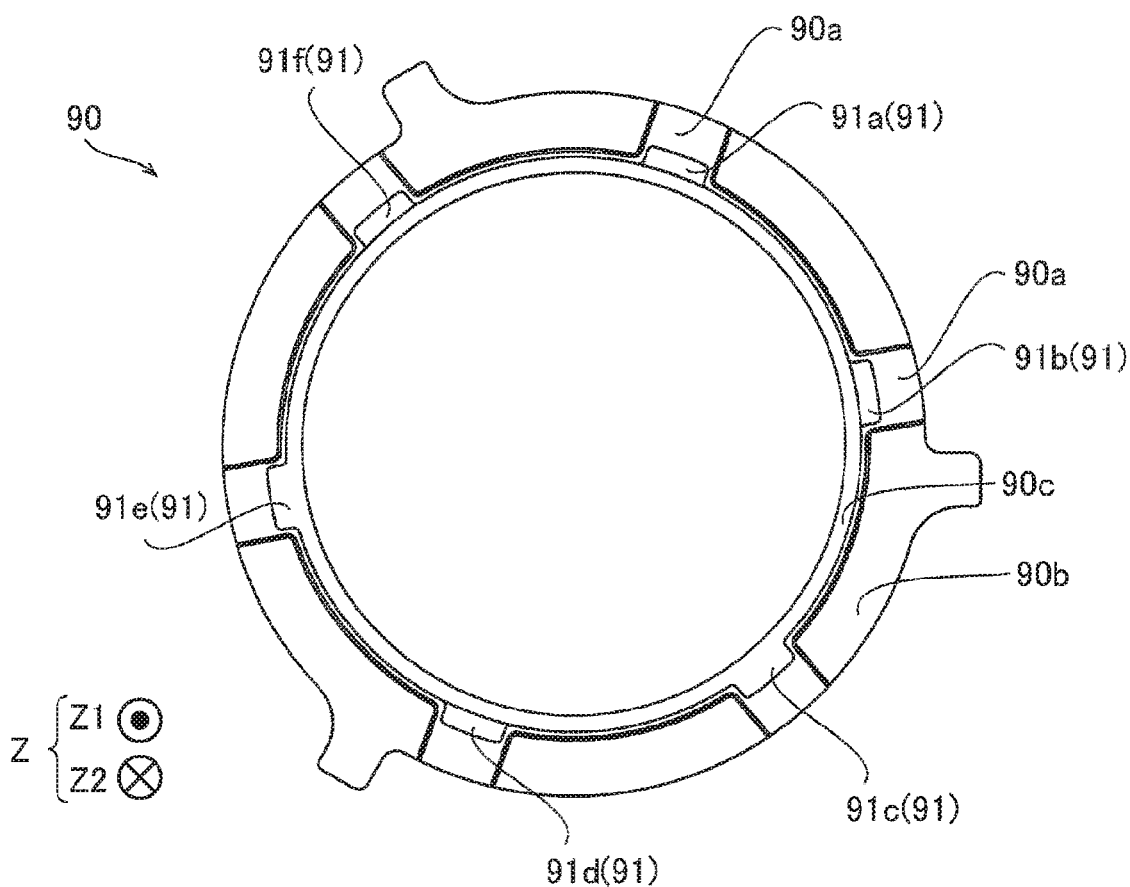
FIGS. 6A and 6B are a plan view and a side view for explaining the inside of the motor before a neutral point bus bar is mounted according to the first embodiment.

As illustrated in FIG. 6A, base engagement portions 91 (specifically, base engagement portions 91a, 91b, 91c, 91d, 91e and 91f) each of which is in a protruding form are provided at the base portion 90. The power bus bars 81 to 83 include bus bar engagement portions 73b (specifically, bus bar engagement portions 731b, 732b and 733b) each of which is in a recess form. The insulation members 74 include insulation engagement portions 74a each of which is in a recess form. The base engagement portions 91 are configured to engage with the bus bar engagement portions 73b of the power bus bars 81 to 83 and the insulation engagement portions 74a of the insulation members 74. As a result, positions of the neutral point bus bar 84 and the power bus bars 81 to 83 in the circumferential direction are restricted. The base engagement portion 91 serves as an example of a holder engagement portion.

Figure 7A:
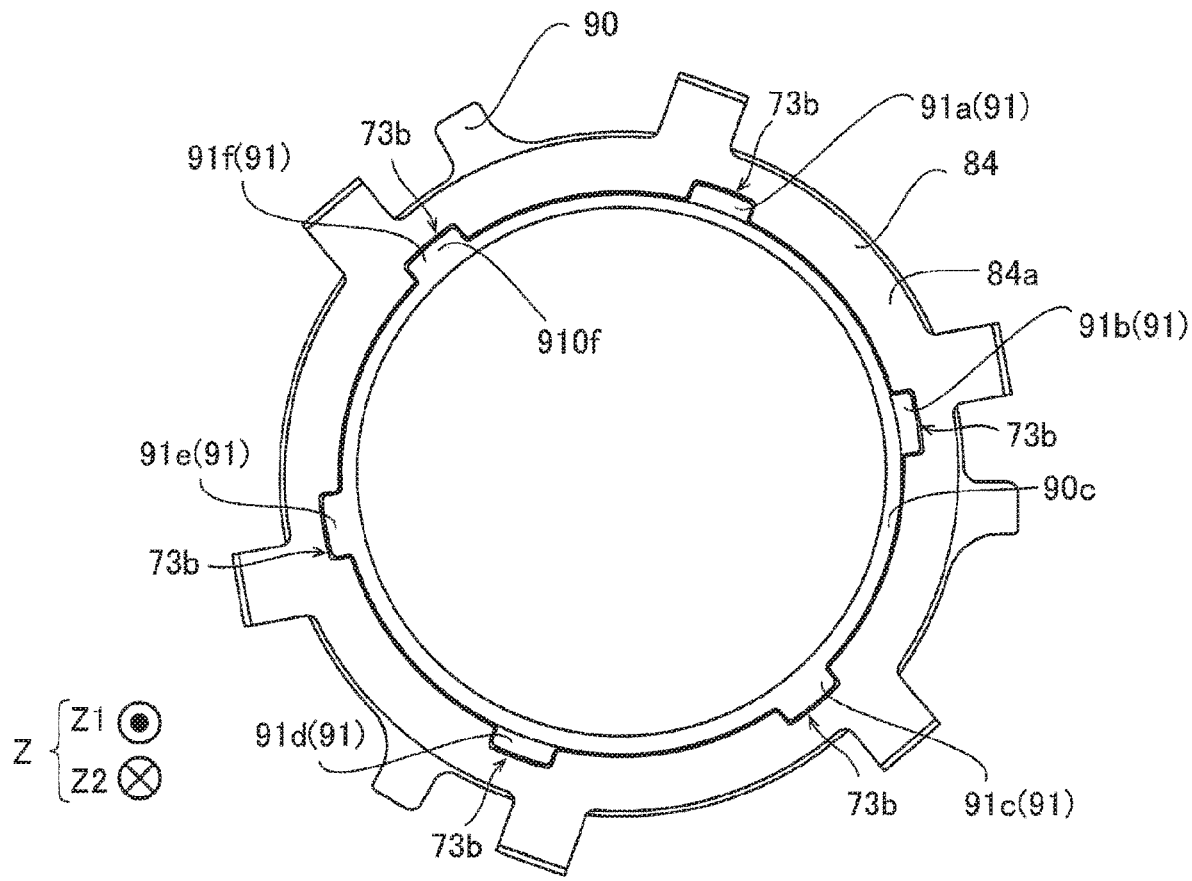
FIGS. 7A and 7B are a plan view and a side view for explaining the inside of the motor after the neutral point bus bar is mounted according to the first embodiment.

The motor 100 (rotary electric machine) includes the power bus bars 81 to 83 each of which is in an arc form and which are connected to the plural power terminals 101, and the neutral point bus bar 84 in an annular form connected to the plural neutral point terminals 102. In addition, the base portion 90 includes the base engagement portions 91 holding the power bus bars 81 to 83 and the neutral point bus bar 84 as in a laminated manner and engaging with the bus bar engagement portions 73b provided at least at one of the power bus bars 81, 82, 83 and the neutral point bus bar 84. Specifically, as illustrated in FIG. 5, the power bus bar 81 includes the two bus bar engagement portions 731b. The power bus bar 82 includes the three bus bar engagement portions 732b. The power bus bar 83 includes the single bus bar engagement portion 733b. The neutral point bus bar 84 includes the six bus bar engagement portions 73b. As illustrated in FIG. 6A, the base portion 90 includes the six base engagement portions 91 which engage with the bus bar engagement portions 73b provided at least at one of the power bus bars 81 to 83 and the neutral point bus bar 84. For example, as illustrated in FIG. 7A, the six base engagement portions 91 engage with the six bus bar engagement portions 73b of the neutral point bus bar 84.

As illustrated in FIG. 6A, the base portion 90 includes six groove portions 90a. The base engagement portions 91 (specifically, the base engagement portions 91a, 91b, 91c, 91d, 91e and 91f) are provided at upper portions of the respective groove portions 90a. In FIGS. 6 to 10, members other than the base portion 90, the insulation members 74, the power bus bars 81 to 83 and the neutral point bus bar 84 are omitted.

Figure 6B:
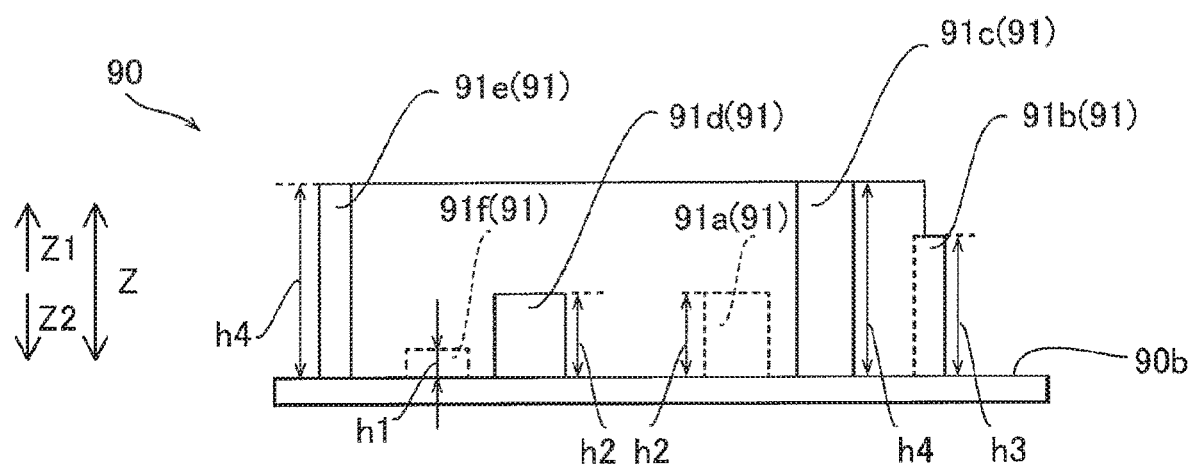
Figure 7B:
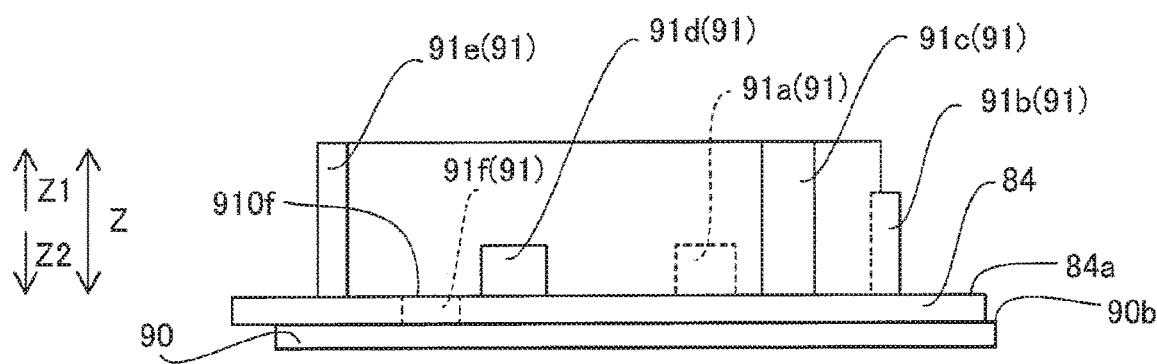

As illustrated in FIG. 6B, the plural base engagement portions 91 include different heights from one another in the axial direction. At least one of the plural base engagement portions 91 engages with the bus bar engagement portion 73b of at least one of the plural bus bars 81 to 83 and 84 so as not to protrude in the axial direction. Specifically, the base engagement portion 91f serving as one of the plural base engagement portions 91 protrudes by a height h1 from a surface 90b (i.e., a lower end surface) of the base portion 90. Each of the base engagement portions 91 a and 91 d protrudes by a height h2 which is higher than the height h1 (for example, three times higher than the height h1) from the surface 90b. The base engagement portion 91b protrudes by a height h3 which is higher than the height h2 (for example, five times higher than the height h1) from the surface 90b. Each of the base engagement portions 91c and 91e protrudes by a height h4 which is higher than the height h3 (for example, seventh times higher than the height h1) from the surface 90b so as to be coplanar with an upper end surface 90c (see FIG. 6A) of the base portion 90. As illustrated in FIG. 7A, the neutral point bus bar 84 includes the six bus bar engagement portions 73b which engage with the six base engagement portions 91 in a case where the neutral point bus bar 84 is placed onto the base portion 90. As illustrated in FIG. 7B, in a case where the neutral point bus bar 84 is placed onto the base portion 90, an upper end surface 84a of the neutral point bus bar 84 and an upper end surface 910f of the base engagement portion 91f are coplanar with each other. In the same manner, in a case where any one of the power bus bars 81 to 83 is placed or mounted onto the base portion 90, an upper end surface of any one of the power bus bars 81 to 83 is coplanar with an upper end surface of any one of the base engagement portions 91a, 91b, 91c, 91d and 91e. In FIGS. 6B and 7B, bus bar terminals 85 and power supply terminals 86 are omitted.

Figure 8B:
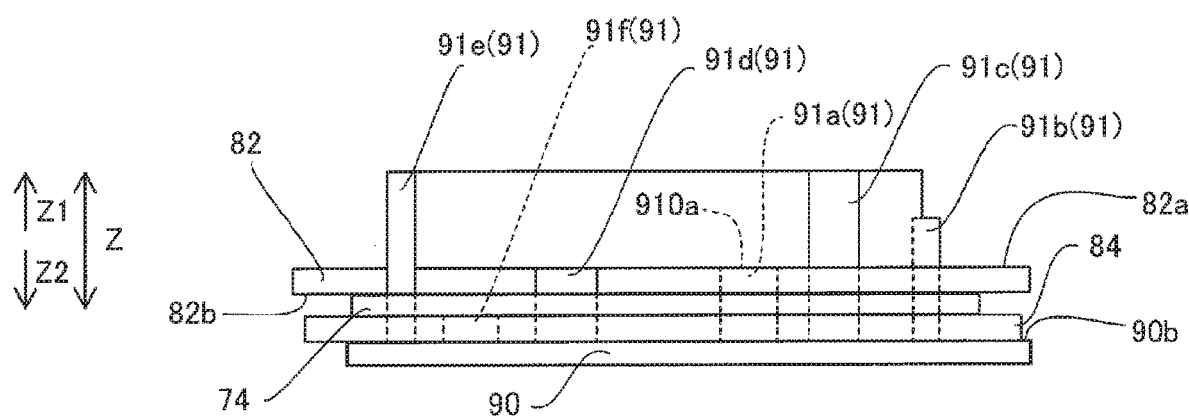

In the embodiment, the plural base engagement portions 91 include the base engagement portions 91a, 91b and 91c. The power bus bars 81 to 83 include the bus bar engagement portions 731b, 732b and 733b. In a state where the base engagement portion 91a engages with the bus bar engagement portion 732b, the base engagement portion 91a is inhibited from protruding from the power bus bar 82 as illustrated in FIG. 8B. In a state where the base engagement portion 91b engages with the bus bar engagement portion 731b, the base engagement portion 91b is inhibited from protruding from the power bus bar 81 as illustrated in FIG. 9B. In a state where the base engagement portion 91c engages with the bus bar engagement portion 733b, the base engagement portion 91c is inhibited from protruding from the power bus bar 83 as illustrated in FIG. 10B. The base engagement portions 91a, 91b and 91c serve as examples of a first protrusion, a second protrusion and a third protrusion, respectively. The bus bar engagement portions 731b, 732b and 733b serves as examples of a second recess, a first recess and a third recess, respectively.

Figure 8A:
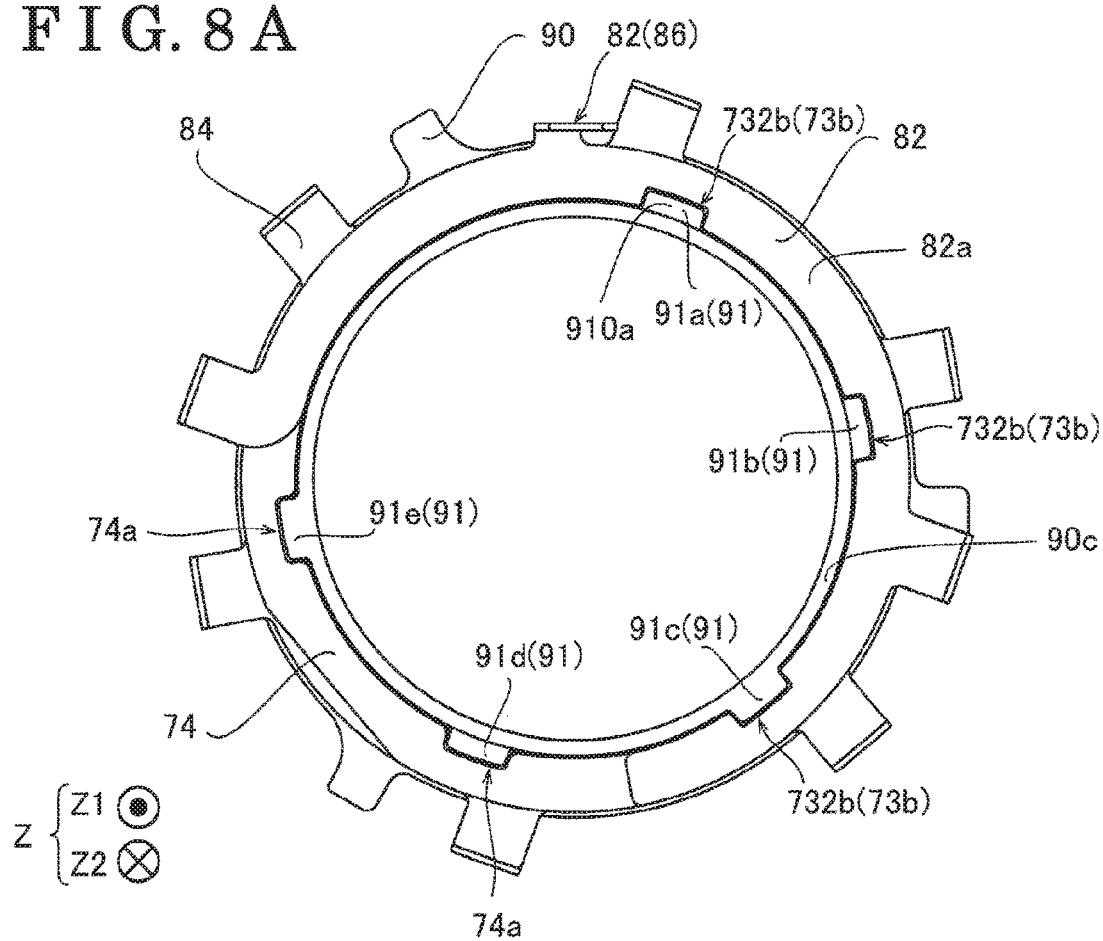
FIGS. 8A and 8B are a plan view and a side view for explaining the inside of the motor after a power bus bar is mounted according to the first embodiment.

Specifically, as illustrated in FIG. 8A, the power bus bar 82 includes the three recessed bus bar engagement portions 732b (73b) which engage with the base engagement portions 91a, 91b and 91c of the base portion 90. The base engagement portions 91d and 91e of the base portion 90 are configured not to engage with the power bus bar 82. As illustrated in FIG. 8B, in a case where the insulation member 74 is mounted or assembled upon the neutral point bus bar 84 and further the power bus bar 82 is mounted upon the insulation member 74, an upper end surface 82a of the power bus bar 82 and an upper surface 910a of the base engagement portion 91a are coplanar with each other. The base engagement portion 91a is inhibited from protruding from the upper end surface 82a of the power bus bar 82. The height of the base engagement portion 91a in the axial direction is substantially equal to the height of the base engagement portion 91d in the axial direction. Each of the base engagement portions 91d and 91e serves as an example of a phase bus bar non-engagement protrusion. In FIG. 8B, the bus bar terminals 85 and the power supply terminals 86 are omitted.

Figure 9A:
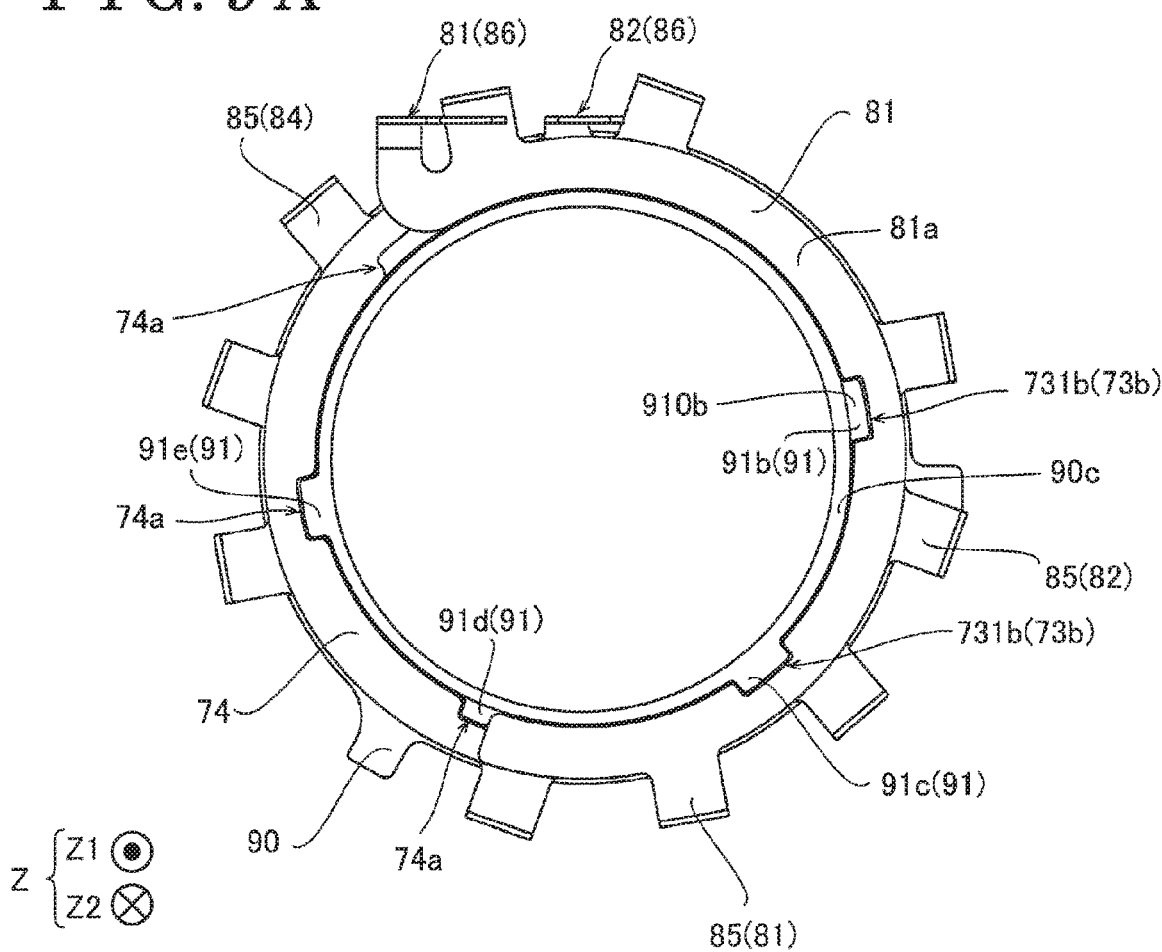
FIGS. 9A and 9B are a plan view and a side view for explaining the inside of the motor after another power bus bar is mounted according to the first embodiment.
Figure 9B:
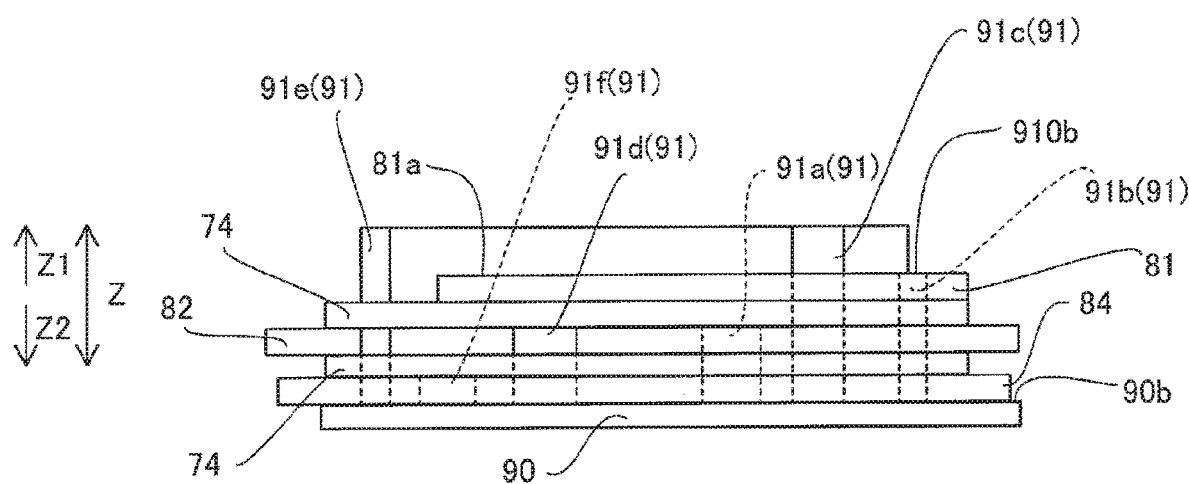

Next, as illustrated in FIG. 9A, the power bus bar 81 includes the two recessed bus bar engagement portions 731b (73b) which engage with the base engagement portions 91b and 91c of the base portion 90. The base engagement portion 91e of the base portion 90 is configured not to engage with the power bus bar 81. The power bus bar 81 covers a portion of the base engagement portion 91d. As illustrated in FIG. 9B, in a case where the insulation member 74 is mounted upon the power bus bar 82 and further the power bus bar 81 is mounted upon the insulation member 74, an upper end surface 81a of the power bus bar 81 and an upper end surface 910b of the base engagement portion 91b are coplanar with each other. The base engagement portion 91b is inhibited from protruding from the upper end surface 81a of the power bus bar 81. In FIG. 9B, the bus bar terminals 85 and the power supply terminals 86 are omitted.

Figure 10A:
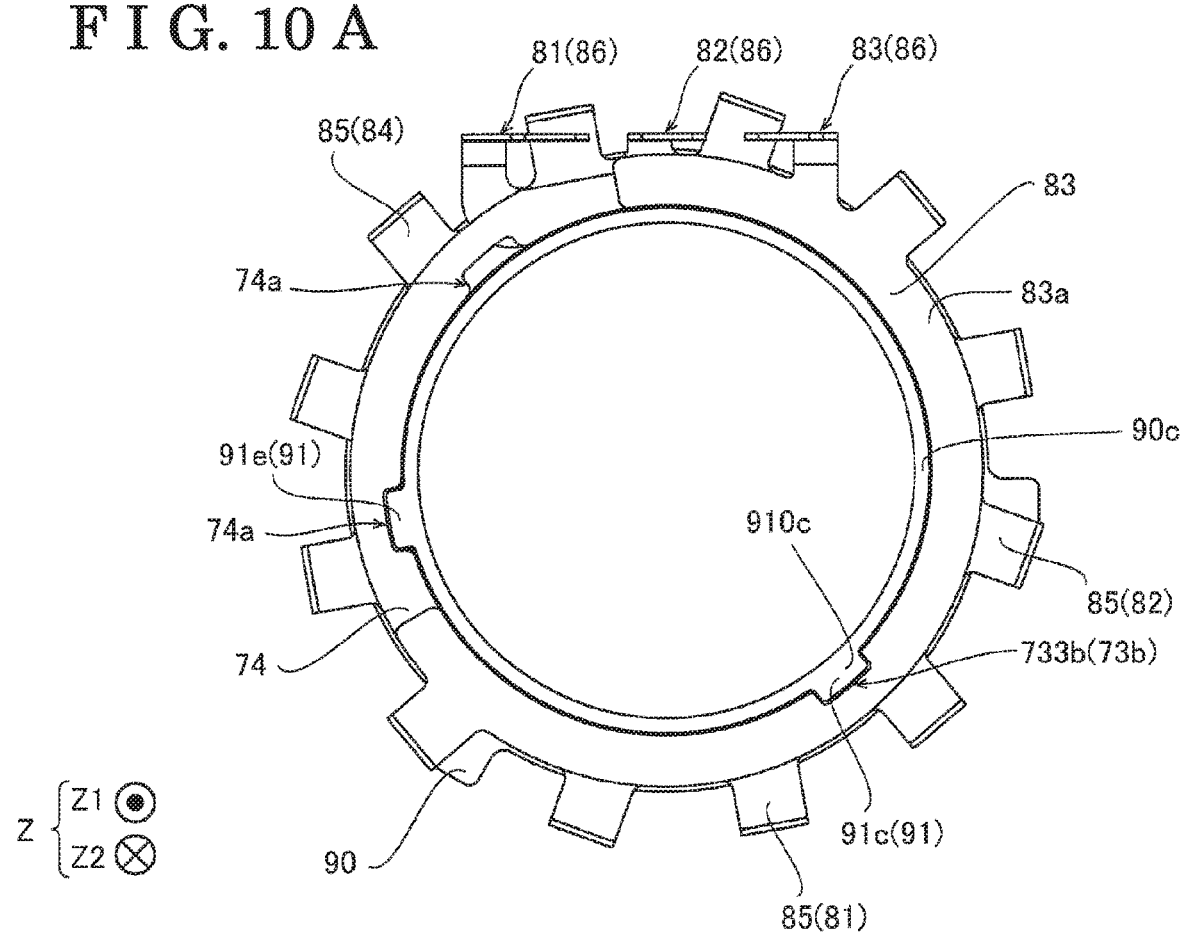
FIGS. 10A and 10B are a plan view and a side view for explaining the inside of the motor after still another power bus bar is mounted according to the first embodiment.
Figure 10B:
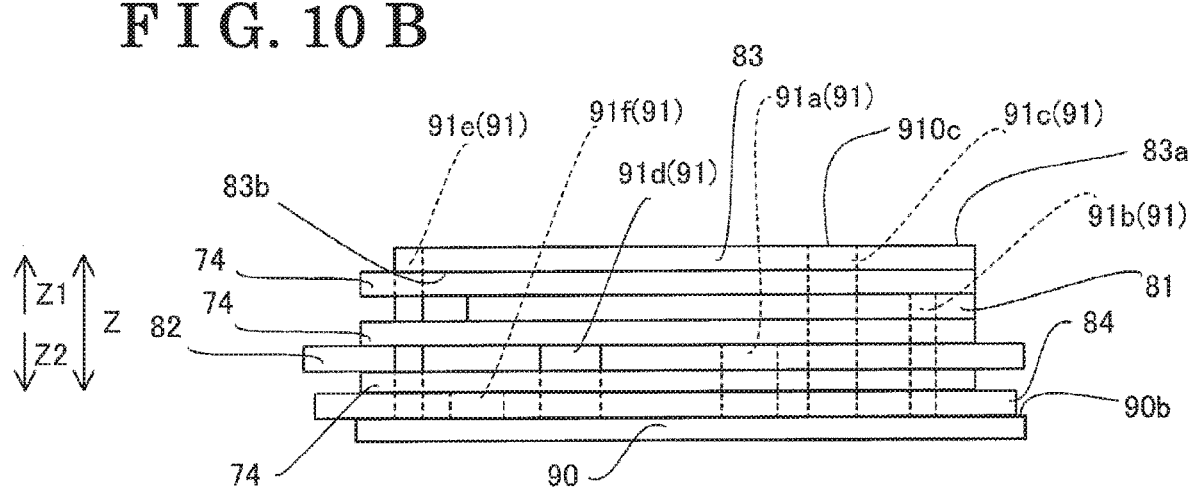

Next, as illustrated in FIG. 10A, the power bus bar 83 includes the single recessed bus bar engagement portion 733b (73b) which engages with the base engagement portion 91c of the base portion 90. The base engagement portion 91e of the base portion 90 is configured not to engage with the power bus bar 83. As illustrated in FIG. 10B, in a case where the insulation member 74 is mounted upon the power bus bar 81 and further the power bus bar 83 is mounted upon the insulation member 74, an upper end surface 83a of the power bus bar 83 and an upper end surface 910c of the base engagement portion 91c are coplanar with each other. The base engagement portion 91c is inhibited from protruding from the upper end surface 83a of the power bus bar 83. The height of the base engagement portion 91c in the axial direction is substantially equal to the height of the base engagement portion 91e in the axial direction.

As illustrated in FIG. 6B, an axial height (height in the axial direction) of the base engagement portion 91c is greater than an axial height (height in the axial direction) of the base engagement portion 91b, and the axial height of the base engagement portion 91b is greater than an axial height (height in the axial direction) of the base engagement portion 91a. In addition, the power bus bars 82, 81 and 83 are placed in order (in the mentioned order) at an upper portion of the base portion 90 from the lower side in the axial direction. Specifically, the base engagement portions 91a, 91b and 91c include the heights h2, h3 and h4, respectively, from the surface 90b of the base portion 90. The height h2 is the smallest and the height h4 is the largest. The height h3 is specified between the height h2 and the height h4.

In the embodiment, the number of the bus bar engagement portions 732b is greater than the number of the bus bar engagement portions 731b while the number of the bus bar engagement portions 731b is greater than the number of the bus bar engagement portion 733b. Specifically, as illustrated in FIGS. 8 to 10, the power bus bar 82 includes the three bus bar engagement portions 732b. The power bus bar 81 includes the two bus bar engagement portions 731b. The power bus bar 83 includes the single bus bar engagement portion 733b.

In the embodiment, in a state where the base engagement portion 91a engages with the bus bar engagement portion 732b, the base engagement portion 91b engages with the bus bar engagement portion 731b, and the base engagement portion 91c engages with the bus bar engagement portion 733b, the axial height of each of the base engagement portions 91d and 91e is specified to be greater than an axial height of a lower end surface of at least one of the power bus bars 81 to 83. Specifically, as illustrated in FIG. 8B, the axial height of each of the base engagement portions 91d and 91e is greater than an axial height of a lower end surface 82b of the power bus bar 82.

In the embodiment, as illustrated in FIGS. 8 to 10, the base portion 90 includes the base engagement portions 91a, 91b and 91c engaging with the power bus bars 81 to 83 and includes the base engagement portions 91d and 91e not engaging with the power bus bars 81 to 83. The neutral point bus bar 84 includes the predetermined number of the bus bar engagement portions 73b which are configured to engage with both the base engagement portions 91a, 91b, 91c, and the base engagement portions 91d, 91e. Specifically, each of the base engagement portions 91d and 91e is inhibited from engaging with the power bus bars 81 to 83. The base engagement portions 91a, 91b and 91c serve as examples of phase bus bar engagement protrusions.

In the embodiment, the number of the bus bar engagement portions 73b provided at the neutral point bus bar 84 is greater than the number of the bus bar engagement portions 73b provided at each of the power bus bars 81 to 83. Specifically, the neutral point bus bar 84 includes the six bus bar engagement portions 73b while the power bus bars 81 to 83 include the two, three and one bus bar engagement portions 73b respectively.

In the embodiment, as illustrated in FIG. 8B, in a state where the base engagement portions 91a, 91b and 91c engage with the bus bar engagement portions 732b, 731b and 733b, respectively, the axial height of the base engagement portion 91d is specified to be greater than the axial height of the lower end surface 82b of the power bus bar 82 and is specified to be equal to or smaller than an axial height of the upper end surface 82a of the power bus bar 82. Specifically, the axial height of the base engagement portion 91d is substantially the same as the axial height of the upper end surface 82a of the power bus bar 82. In FIG. 8B, the bus bar terminals 85 and the power supply terminals 86 are omitted.

In the present embodiment, as illustrated in FIG. 10B, in a state where the base engagement portions 91a, 91b and 91c engage with the bus bar engagement portions 732b, 731b and 733b, respectively, the axial height of the base engagement portion 91e is specified to be greater than an axial height of a lower end surface 83b of the power bus bar 83. Specifically, the axial height of the base engagement portion 91e is substantially the same as an axial height of the upper end surface 83a of the power bus bar 83. In FIG. 10B, the bus bar terminals 85 and the power supply terminals 86 are omitted.

As illustrated in FIG. 4, the thin plate of each of the bus bars 81 to 83 is bent to the axially upper side so as to obtain the two bus bar terminals 85. The two bus bar terminals 85 of each of the bus bars 81 to 83 are provided to make contact with radially inner side surfaces of the corresponding power terminals 101. The two bus bar terminals 85 are configured to join by welding to the corresponding power terminals 101. For example, the bus bar terminals 85 are configured to join to the U-phase power terminals 101*a* and 101*b*.

As illustrated in FIGS. 4 and 5, the power supply terminal 86 connected to the external connection terminal 13 (see FIG. 1) is provided at each of the power bus bars 81 to 83. Each of the power bus bars 81 to 83 is therefore configured to transmit an electric power from the external connection terminal 13 to the windings 50.

The thin plate of the neutral point bus bar 84 is bent to the axially upper side so as to obtain the six bus bar terminals 85. The six bus bar terminals 85 are configured to join by welding to the respective neutral point terminals 102.

According to the first embodiment, the bus bar engagement portions 73*b* engage with the base engagement portions 91 so that the power bus bars 81 to 83 are assembled on the base portion 90 at a predetermined phase (at a predetermined rotation direction position). Thus, each of the power bus bars 81 to 83 is restrained from being assembled in a wrong phase. In addition, possibility of connection failure between the power bus bars 81 to 83 and the windings 50 may decrease.

Any one of the bus bars 81 to 84 where the bus bar engagement portion 73*b* is not provided at a portion corresponding to the position of the base engagement portion 91 which is inhibited from protruding in the axial direction because of the engagement with the bus bar engagement portion 73*b* of any other of the bus bars 81 to 84 may be placed upon any other of the bus bars 81 to 84. That is, any one of the bus bars 81 to 84 where the bus bar engagement portion 73*b* is provided so as to engage with the base engagement portion 91 serving as a predetermined base engagement portion which is inhibited from protruding in the axial direction because of the engagement with the aforementioned bus bar engagement portion 73*b,* and any other of the bus bars 81 to 84 where the bus bar engagement portion 73*b* is not provided for the engagement with the aforementioned predetermined base engagement portion are assembled in the mentioned order. Thus, the bus bars 81 to 84 are restrained from being assembled in a wrong order and possibility of connection failure between the power bus bars 81 to 83 and the windings 50 may decrease.

In the first embodiment, the number of the base engagement portions 91 protruding from the upper end surface 82*a* of the power bus bar 82 in a case where the power bus bar 82 is assembled, the number of the base engagement portions 91 protruding from the upper end surface 81 *a* of the power bus bar 81 in a case where the power bus bar 81 is assembled, and the number of the base engagement portions 91 protruding from the upper end surface 83*a* of the power bus bar 83 in a case where the power bus bar 83 is assembled are different from one another. Thus, the bus bars 81 to 84 are restrained from being assembled in the wrong order and possibility of connection failure between the power bus bars 81 to 83 and the windings 50 may decrease.

In the first embodiment, because of the plural base engagement portions 91 including the different heights from one another, the power bus bars 82, 81 and 83 may interfere with at least one of the plural base engagement portions 91 in a case where the power bus bars 82, 81 and 83 are assembled in the wrong order. Thus, the bus bars 81 to 84 are restrained from being assembled in the wrong order and possibility of connection failure between the power bus bars 81 to 83 and the windings 50 may decrease.

In the first embodiment, while the power bus bars 82, 81 and 83 are sequentially assembled or placed in the mentioned order from the lower side in the axial direction, the number of the base engagement portions 91 protruding from the upper end surfaces of the respective power bus bars 82, 81 and 83 decreases and the number of the bus bar engagement portions 73*b* decreases. Consequently, the power bus bars 81 to 83 are restrained from being assembled in the wrong phase (wrong rotation direction position). In addition, the power bus bars 81 to 83 are restrained from being assembled in the wrong order.

Because of the aforementioned construction, in a case where at least one of the power bus bars 82, 81 and 83 is assembled or mounted, the base engagement portion 91*d* or 91*e* protrudes from the surface of the aforementioned one of the power bus bars 82, 81 and 83. Thus, at least one of the power bus bars 82, 81 and 83 is restrained from being assembled in the wrong phase (wrong rotation direction position). In addition, in a case where the bus bar engagement portion 73*b* is not provided at a portion corresponding to a portion where the base engagement portion 91*d* or 91*e* protrudes from the surface of at least one of the power bus bars 82, 81 and 83, assembly of the aforementioned one of the power bus bars 82, 81 and 83 where the bus bar engagement portion 73*b* is not provided may be impossible. The power bus bars 81 to 83 are therefore restrained from being assembled in the wrong order.

The first embodiment is not limited to have the aforementioned construction and may be appropriately modified or changed.

For example, in the first embodiment, the windings 50 are connected in the Y-connection as an example. Alternatively, the windings may be connected in a delta-connection, for example.

In addition, in the first embodiment, the two bus bar terminals 85 are provided at each of the power bus bars 81 to 83. Alternatively, three or more than three bus bar terminals may be provided at each of the power bus bars.

Further, in the first embodiment, the number of the base engagement portions 91 of the base portion 90 is six. Alternatively, the number of base engagement portions of the base portion may be eight, for example.

Furthermore, in the first embodiment, the power bus bar 82 serves as the U-phase bus bar. Then, the power bus bar 83 serves as the V-phase bus bar while the power bus bar 81 serves as the W-phase bus bar. Alternatively, the power bus bar 81 may serve as the V-phase bus bar or the U-phase bus bar, for example.

The following construction may be also obtainable in the motor 100 serving as the rotary electric machine according to the first embodiment.

In the rotary electric machine, plural bus bars include a common bus bar in an annular form and a phase bus bar in an arc form. A bus bar holder includes a phase bus bar engagement protrusion which engages with the phase bus bar and a phase bus bar non-engagement protrusion which is inhibited from engaging with the phase bus bar. The common bus bar in the annular form includes a predetermined number of bus bar engagement portions, the bus bar engagement portions of the common bus bar being configured to engage with both the phase bus bar engagement protrusion and the phase bus bar non-engagement protrusion.

According to the aforementioned construction, the common bus bar engages with both the phase bus bar engagement protrusion and the phase bus bar non-engagement protrusion. Thus, the common bus bar may be assembled before the phase bus bar is assembled.

In addition, in the rotary electric machine, the plural bus bars include the common bus bar in the annular form and the phase bus bar in the arc form. The number of the bus bar engagement portions provided at the common bus bar is specified to be greater than the number of bus bar engagement portions provided at the phase bus bar.

According to the aforementioned construction, because the number of the bus bar engagement portions provided at the common bus bar is specified to be greater than the number of the bus bar engagement portions provided at the phase bus bar, possibility of incapable assembly of the common bus bar on the bus bar holder caused by non-engagement between the bus bar engagement portion of the common bus bar and a holder engagement portion provided at the bus bar holder may be restrained.

Further, in the rotary electric machine, a first phase bus bar, a second phase bus bar and a third phase bus bar are assembled in the mentioned order from the lower side in the axial direction onto the bus bar holder. An axial height of the phase bus bar non-engagement protrusion is specified to be greater than an axial height of a lower end surface of the first phase bus bar and specified to be equal to or smaller than an axial height of an upper end surface of the first phase bus bar in a state where a first protrusion, a second protrusion and a third protrusion provided at the bus bar holder engage with a first recess, a second recess, and a third recess provided at the first phase bus bar, the second phase bus bar and the third phase bus bar, respectively.

According to the aforementioned construction, the phase bus bar non-engagement protrusion protrudes from the lower end surface of the first phase bus bar in a state where the first phase bus bar is assembled. Thus, the second phase bus bar and the third phase bus bar are unable to be assembled before the first phase bus bar is assembled. The phase bus bars are restrained from being assembled in a wrong order. In addition, because the movement of the first phase bus bar in the circumferential direction is restricted by the phase bus bar non-engagement protrusion, the first phase bus bar is restrained from being assembled in the wrong phase. That is, an end portion of the first phase bus bar interferes with the phase bus bar non-engagement protrusion, which may restrain the first phase bus bar from being wrongly assembled.

Furthermore, in the rotary electric machine, the first phase bus bar, the second phase bus bar and the third phase bus bar are assembled in the mentioned order from the lower side in the axial direction onto the bus bar holder. The axial height of the phase bus bar non-engagement protrusion is specified to be greater than the axial height of the lower end surface of the third phase bus bar in a state where the first protrusion, the second protrusion and the third protrusion provided at the bus bar holder engage with the first recess, the second recess, and the third recess provided at the first phase bus bar, the second phase bus bar and the third phase bus bar, respectively.

According to the aforementioned construction, the phase bus bar non-engagement protrusion protrudes from the lower end surface of the third phase bus bar in a state where the third phase bus bar is assembled. Thus, the movement of each of the first to third phase bus bars in the circumferential direction may be restricted by the phase bus bar non-engagement protrusion. Each of the first to third phase bus bars is restrained from being assembled in the wrong phase. That is, the end portion of each of the first to third phase bus bars interferes with the phase bus bar non-engagement protrusion, which may restrain the first to third phase bus bars from being assembled in the wrong phase.

Next, a second embodiment is explained below. A construction of the motor 100 according to the second embodiment is explained with reference to FIGS. 1 to 3, 11 to 18.

[Winding Connection]

Figure 11:
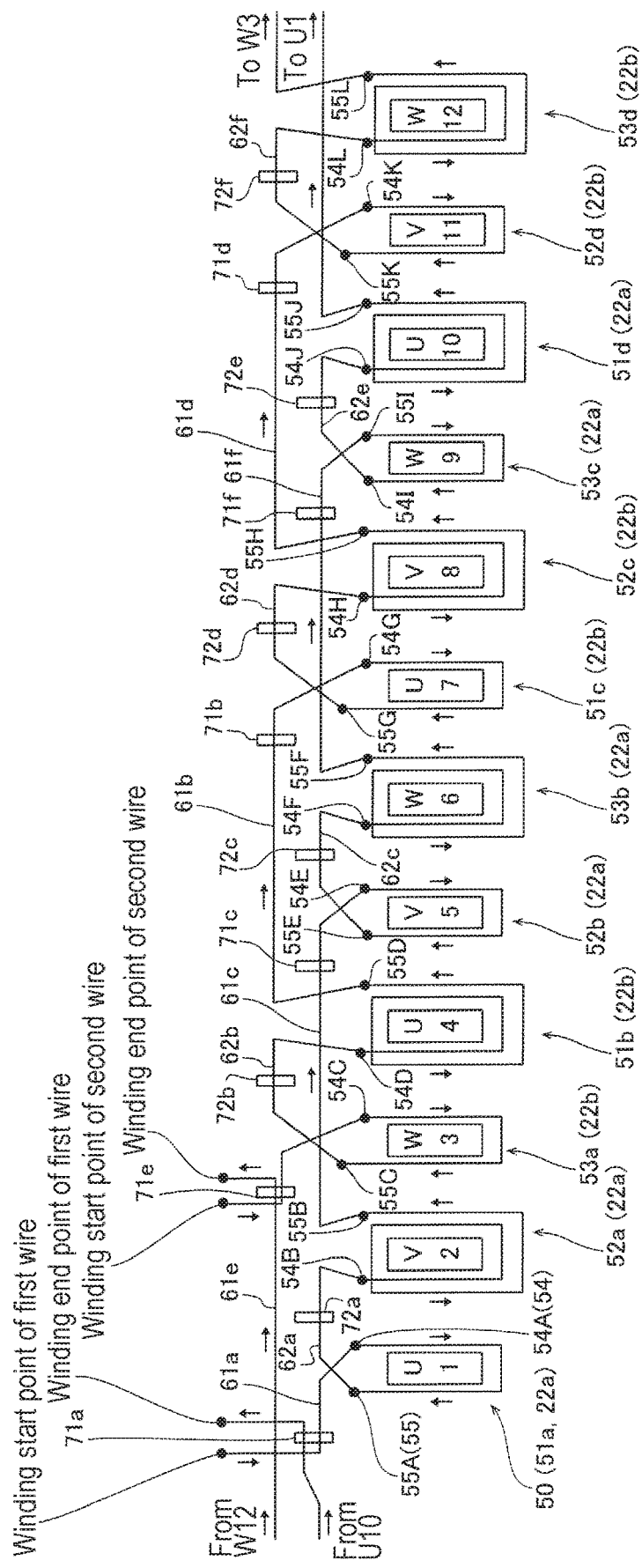
FIG. 11 is a development connection diagram when viewed from a radially inner side of the motor according to the second embodiment disclosed here.

According to the second embodiment, as illustrated in FIG. 11, the windings 50 include common phase crossover wire portions 61 and different phase crossover wire portions 62. Each of the common phase crossover wire portions 61 and the different phase crossover wire portions 62 connects each winding start portion 54 (i.e., 54A, 54B, 54C, 54D, 54E, 54F, 54G, 54H, 54I, 54J, 54K or 54L) of one of the windings 50 and each winding end portion 55 (i.e., 55A, 55B, 55C, 55D, 55E, 55F, 55G, 55H, 55I, 55J, 55K or 55L) of another one of the windings 50. Each of the common phase crossover wire portions 61 serves as an example of a crossover wire portion. Each of the different phase crossover wire portions 62 serves as an example of the crossover wire portion. The common phase crossover wire portions 61 are connected to power terminals 71 serving as examples of terminal members and power connection terminals. The different phase crossover wire portions 62 are connected to neutral point terminals 72 serving as examples of the terminal members and neutral point connection terminals. Each of the power terminal 71 and the neutral point terminal 72 also serves as an example of the winding connection terminal. The power terminals 71 and the neutral point terminals 72 are connected to respective ends of the windings 50.

Specifically, each of the common phase crossover wire portions 61 is configured to connect between the two windings 50 in the four windings 50, the two windings serving as the same phase windings. Two of the common phase crossover wire portions 61 are provided for each phase of the three-phase voltage. That is, the common phase crossover wire portions 61 include two U-phase crossover wire portions 61a, 61b, two V-phase crossover wire portions 61c, 61d, and two W-phase crossover wire portions 61e, 61f. For example, the U-phase crossover wire portion 61a is configured to connect the winding start portion 54A of the U-phase winding 51a serving as one of the U-phase windings and the winding end portion 55J of the U-phase winding 51d serving as another one of the U-phase winding. In the same way as the U-phase crossover wire portion 61a, each of the other common phase crossover wire portions 61 (61b to 61f) is configured to connect the winding start portion 54 (54B to 54L) of one of the windings 50 and the winding end portion 55 (55B to 55L) of another one of the windings 50, one of the windings 50 and another one of the windings 50 serving as the same phase windings.

In the second embodiment, the two power terminals 71 are provided for each phase of the three-phase voltage so as to conform to the number of the common phase crossover wire portions 61. Specifically, the power terminals 71 include U-phase power terminals 71a, 71b, V-phase power terminals 71c, 71d, and W-phase power terminals 71e, 71f. The U-phase crossover wire portions 61a and 61b are connected to the U-phase power terminals 71a and 71b, respectively. The V-phase crossover wire portions 61c and 61d are connected to the V-phase power terminals 71c and 71d, respectively. The W-phase crossover wire portions 61e and 61f are connected to the W-phase power terminals 71e and 71f, respectively.

In the second embodiment, each of the different phase crossover wire portions 62 is configured to connect the winding start portion 54 of one of the windings 50 and the winding end portion 55 of another one of the windings 50 wound at the tooth 22 adjacent to the tooth 22 at which the aforementioned one of the windings 50 is wound, the aforementioned one of the windings 50 and another one of the windings 50 serving as the different phase windings from each other.

The different phase crossover wire portions 62 include different phase crossover wire portions 62a, 62b, 62c, 62d, 62e and 62f. For example, the different phase crossover wire portion 62a is configured to connect the winding start portion 54B of the V-phase winding 52a and the winding end portion 55A of the U-phase winding 51a serving as the different phase winding from the V-phase winding 52a, the U-phase winding 51a being wound at the tooth 22 with no. 1 adjacent to the tooth 22 with no. 2 at which the V-phase winding 52a is wound. In the same way as the different phase crossover wire portion 62a, each of the different phase crossover wire portions 62b, 62c, 62d, 62e and 62f is configured to connect the winding start portion 54 of the winding 50 for one of the three phases and the winding end portion 55 of the winding 50 for another one of the three phases wound at the tooth 22 adjacent to the tooth 22 at which the winding 50 for the aforementioned one of the three phases is wound.

The neutral point terminals 72 include neutral point terminals 72a, 72b, 72c, 72d, 72e and 72f. The different phase crossover wire portions 62a to 62f are connected to the neutral point terminals 72a to 72f, respectively.

As illustrated in FIG. 11, the common phase crossover wire portions 61, the different phase crossover wire portions 62 and the windings 50 are obtained by a first wire 63 and a second wire 64 which are continuously provided and each of which serves as a continuous wire. Specifically, the teeth 22 with nos. 1, 2, 5, 6, 9 and 10 constitute a first teeth group 22a. The first wire 63 is continuously wound at the first teeth group 22a so as to obtain the common phase crossover wire portions 61, the different phase crossover wire portions 62 and the windings 50. In addition, the teeth 22 with nos. 3, 4, 7, 8, 11 and 12 constitute a second teeth group 22b. The second wire 64 is continuously wound at the second teeth group 22b to obtain the common phase crossover wire portions 61, the different phase crossover wire portions 62 and the windings 50.

The first wire 63 is configured to start its winding (wiring) at the U-phase power terminal 71a upon forming the common phase crossover wire portions 61, the different phase crossover wire portions 62 and the windings 50, and thereafter to finish the winding at the U-phase power terminal 71a. The second wire 64 is configured to start its winding (wiring) at the W-phase power terminal 71e upon forming the common phase crossover wire portions 61, the different phase crossover wire portions 62 and the windings 50, and thereafter to finish the winding at the W-phase power terminal 71e.

Figure 12:
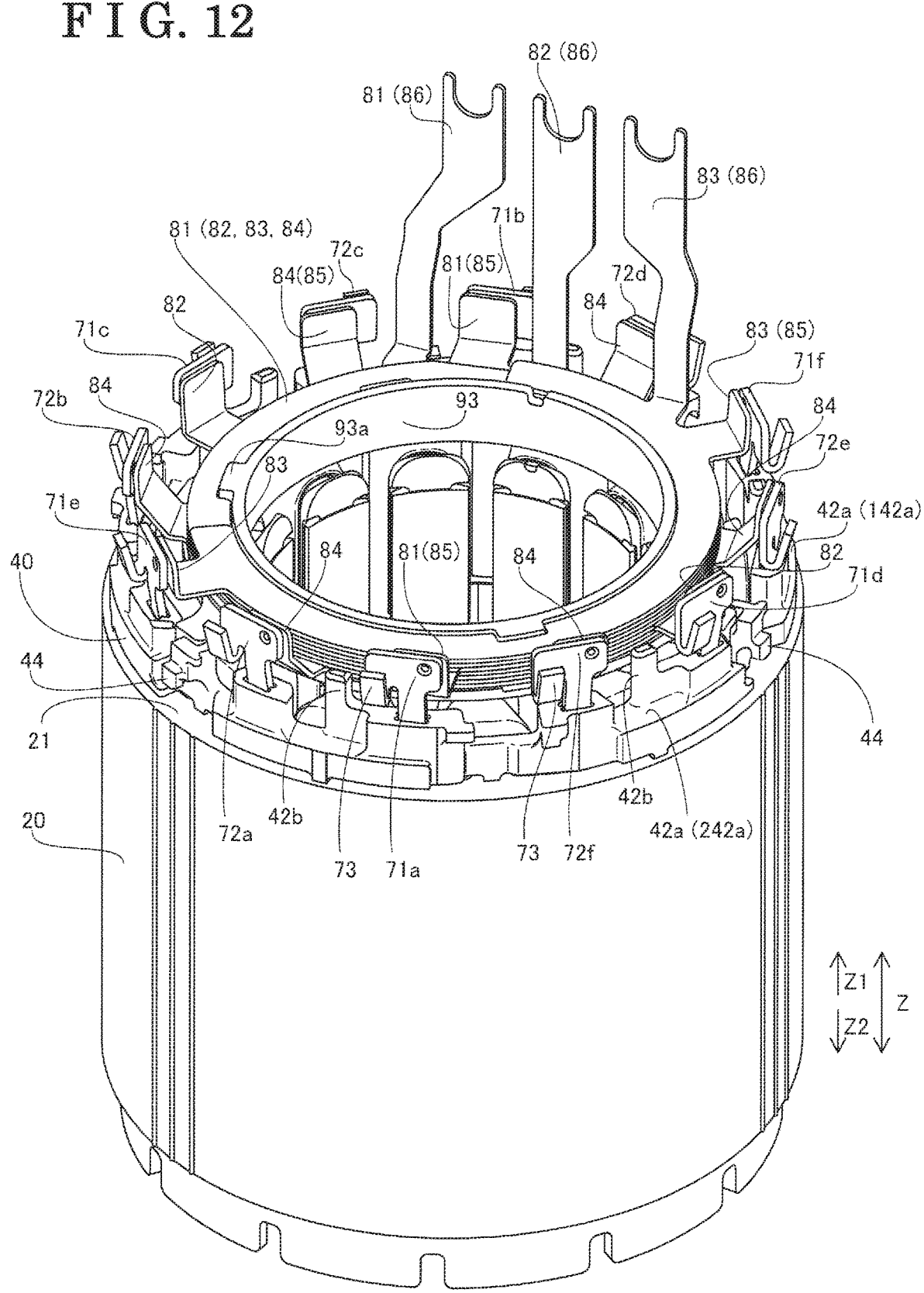
FIG. 12 is a perspective view for explaining the inside of the motor according to the second embodiment.

As illustrated in FIG. 12, the motor 100 includes the power bus bars 81, 82 and 83 each of which serves as the bus bar. The power bus bar 81 is connected to the U-phase power terminals 71a and 71b. The power bus bar 82 is connected to the V-phase power terminals 71c and 71d. The power bus bar 83 is connected to the W-phase power terminals 71e and 71f. The power bus bars 81 to 83 are also connected to the respective external connection terminals 13 (see FIG. 1). The motor 100 also includes the neutral point bus bar 84 which is connected to all the neutral point terminals 72 (specifically, neutral point terminals 72a, 72b, 72c, 72d, 72e and 72f). As a result, a three-phase and four-parallel Y connection is obtained in the motor 100.

[Construction of Insulator]

Figure 13:
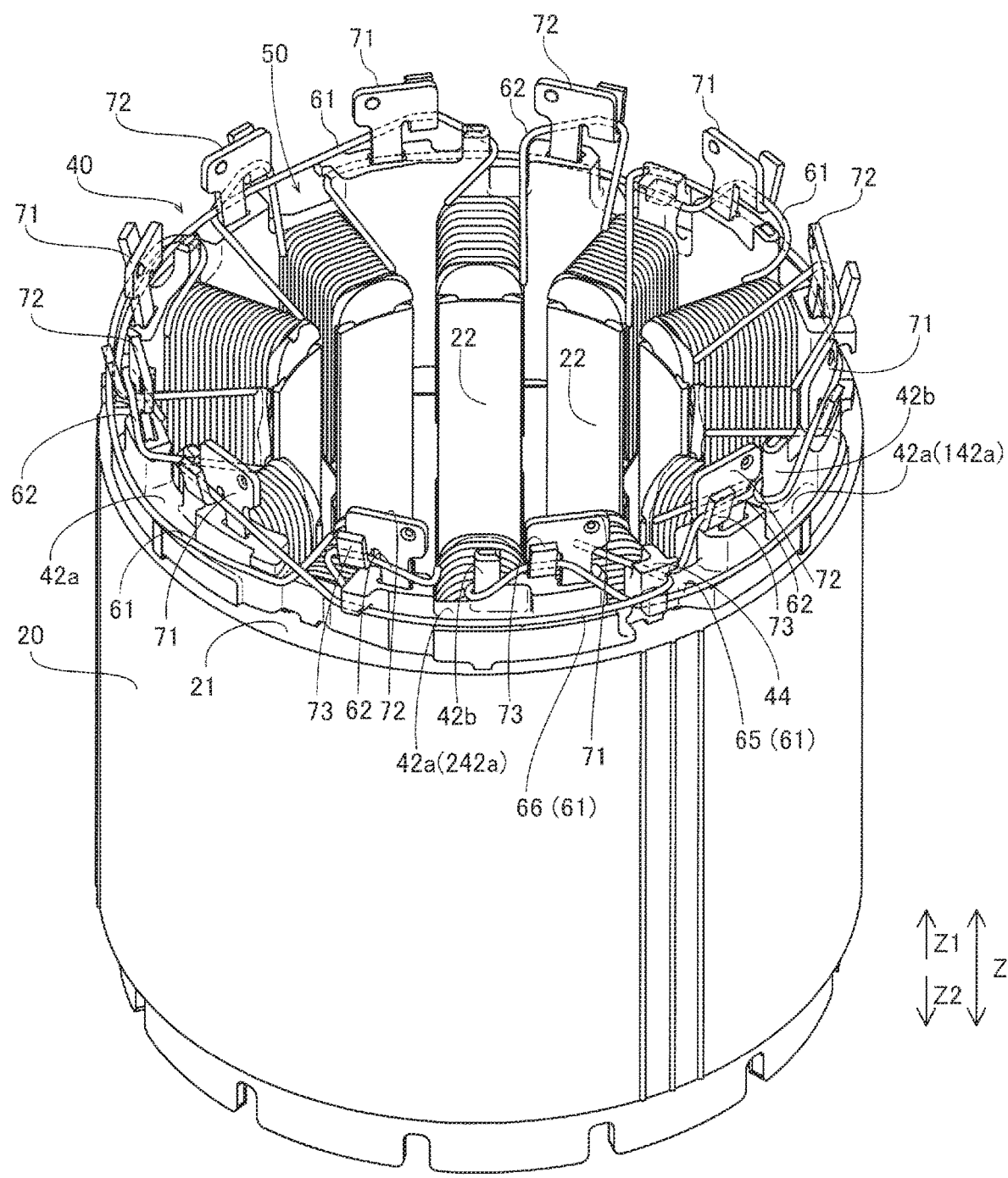
FIG. 13 is a perspective view for explaining a crossover wire portion and a crossover wire arrangement portion of the motor according to the second embodiment.

As illustrated in FIG. 13, the insulator 40 is provided to cover the plural teeth 22 of the stator core 20 and is configured to insulate between the stator core 20 and the plural windings 50.

Figure 14:
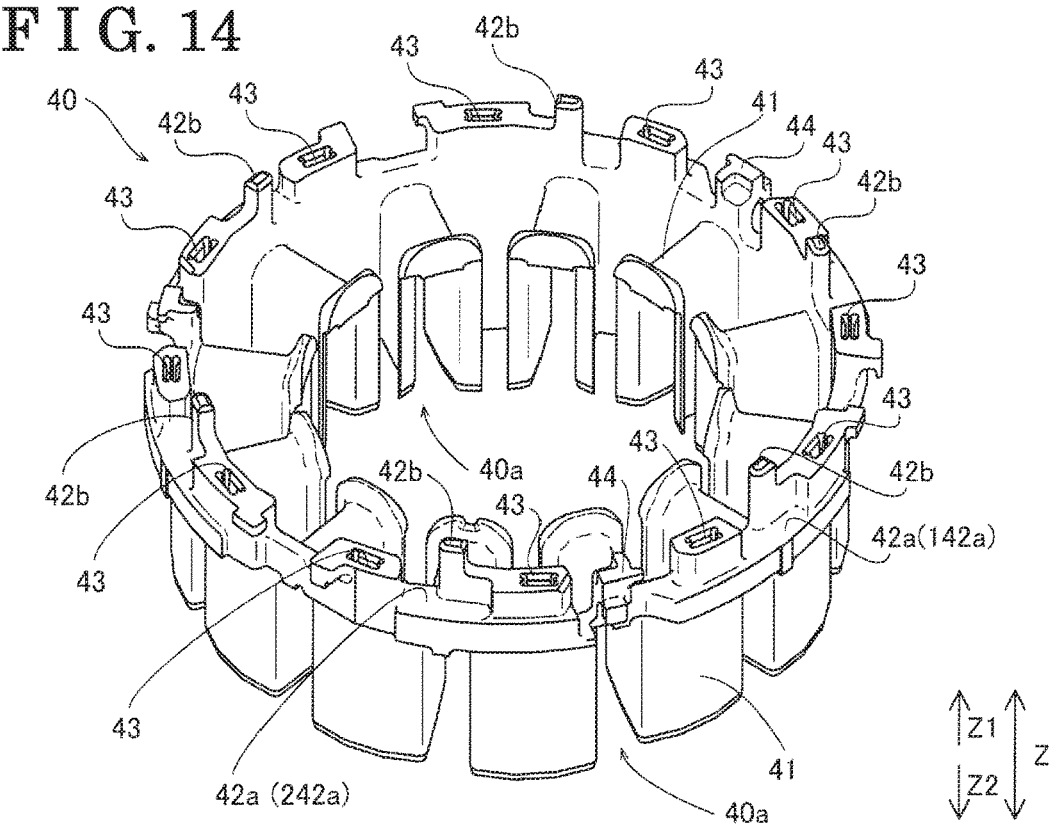
FIG. 14 is a perspective view of an insulator of the motor when viewed in the axial direction according to the second embodiment.

Specifically, the insulator 40 is made of resin including insulation properties. The insulator 40 includes a configuration conforming to a surface configuration of the stator core 20. The insulator 40 includes a void at an inside at which the stator core 20 is arranged. As illustrated in FIG. 14, the insulator 40 includes an opening portion 40a at an axially lower side (i.e., in an arrow Z2 direction). The insulator 40 is configured to be mounted to the stator core 20 from the axially upper side.

Figure 15:
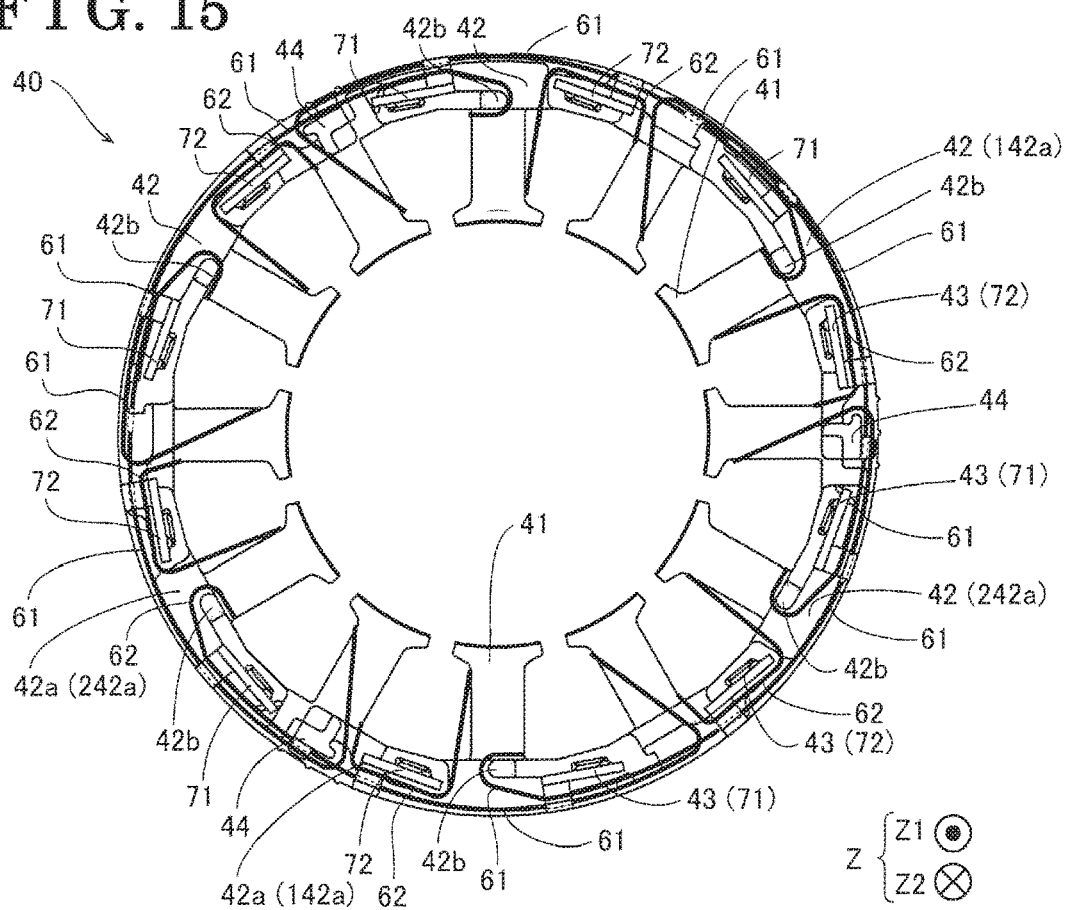
FIG. 15 a plan view of the insulator of the motor when viewed in the axial direction according to the second embodiment.

As illustrated in FIG. 15, the insulator 40 includes an annular configuration when viewed in the axial direction. The insulator 40 is configured so that the rotor core 30 (see FIG. 2) is arranged at an inner portion of the annular configuration.

The insulator 40 includes a teeth cover portion 41 covering the teeth 22. The windings 50 are wound at the teeth 22 via the teeth cover portion 41.

In the second embodiment, as illustrated in FIG. 15, the insulator 40 includes crossover wire arrangement portions 42 at which the common phase crossover wire portions 61 are arranged at the outer circumferential side of the stator core 20 when viewed in the axial direction (when viewed in the arrow Z1 direction).

Specifically, as illustrated in FIG. 13, each of the crossover wire arrangement portions 42 is provided at an outer circumferential portion of the insulator 40. The crossover wire arrangement portion 42 includes a flange portion 42a disposed at a lower wide in the axial direction (i.e., in the arrow Z2 direction) than the power terminal 71 and the neutral point terminal 72. The common phase crossover wire portion 61 is arranged along the flange portion 42a. The flange portion 42a is disposed at the axially upper side (i.e., in the arrow Z1 direction) of the back yoke 21 of the stator core 20. That is, the flange portion 42a is arranged at the outer circumferential side of the teeth 22 and at the inner side than an outer circumference of the back yoke 21.

As illustrated in FIG. 14, the insulator 40 includes terminal attachment portions 43 at which the power terminals 71 and the neutral point terminals 72 are configured to be attached. Specifically, the twelve terminal attachment portions 43 are provided at substantially equal angular intervals in the circumferential direction at the outer circumferential portion of the insulator 40 and between the adjacent teeth 22 respectively. The terminal attachment portions 43 include respective openings at the axially upper side so that the power terminals 71 and the neutral point terminals 72 are mounted from the axially upper side to the terminal attachment portions 43 as illustrated in FIG. 12. Thus, the flange portions 42a are arranged at the axially lower side (arrow Z2 side) than the power terminals 71 and the neutral point terminals 72.

Respective portions of the power terminals 71 and the neutral point terminals 72 are bent to the axially upper side (arrow Z1 direction) to obtain wire joint portions 73 each of which is in a hook form. In a state where the common phase crossover wire portion 61 or the different phase crossover wire portion 62 is disposed at the wire joint portion 73, the wire joint portion 73 is connected to the common phase crossover wire portion 61 or the different phase crossover wire portion 62 by fusing welding. Therefore, the power terminal 71 and the common phase crossover wire portion 61 are joined at the wire joint portion 73 while the neutral point terminal 72 and the different phase crossover wire portion 62 are joined at the wire joint portion 73. Because of the joining at the wire joint portion 73, the winding 50 is configured to be connected to the power terminal 71 or the neutral point terminal 72 in a state where the winding start portion 54 of one of the windings 50 and the winding end portion 55 of another one of the windings 50 are connected to each other.

Figure 16:
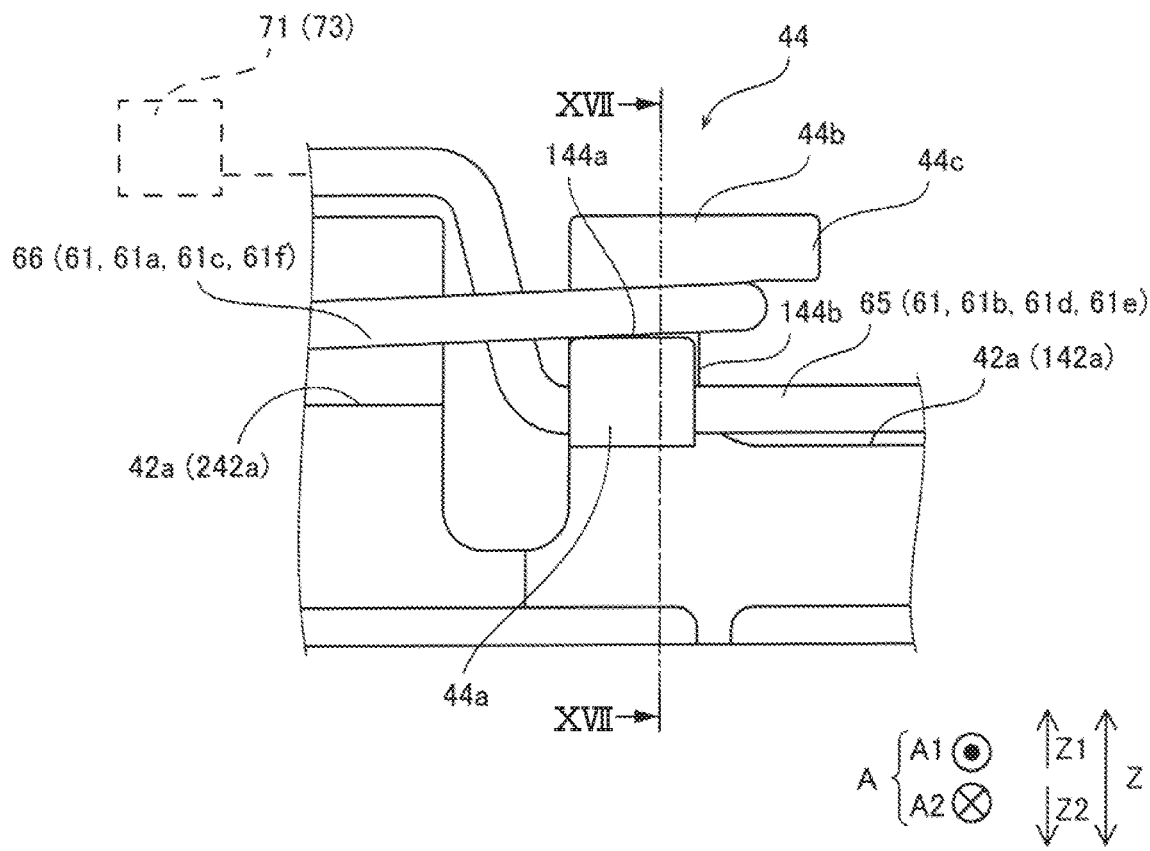
FIG. 16 is a side view illustrating a construction of a crossover wire restriction portion of the motor according to the second embodiment.

As illustrated in FIG. 16, the insulator 40 includes a crossover wire restriction portion 44 serving as an example of a first restriction portion and a second restriction portion which restricts a wiring position between the common phase crossover wire portions 61 for different phases of the three-phase voltage. Specifically, the common phase crossover wire portions 61 include a first common phase crossover wire portion 65 (for example, the U-phase crossover wire portion 61*b*, the V-phase crossover wire portion 61*d* or the W-phase crossover wire portion 61*e*) which is disposed from the flange portion 42*a* to the power terminal 71 (power terminal 71*b*, 71*d* or 71*e*) for one of the phases of the three-phase voltage. The crossover wire restriction portion 44 includes a first hook portion 44*a* serving as an example of the first restriction portion arranged at a height position (i.e., height position in a direction parallel to a Z-axis direction) between the flange portion 42*a* and the power terminal 71 to restrict a height position of the first common phase crossover wire portion 65.

Figure 17:
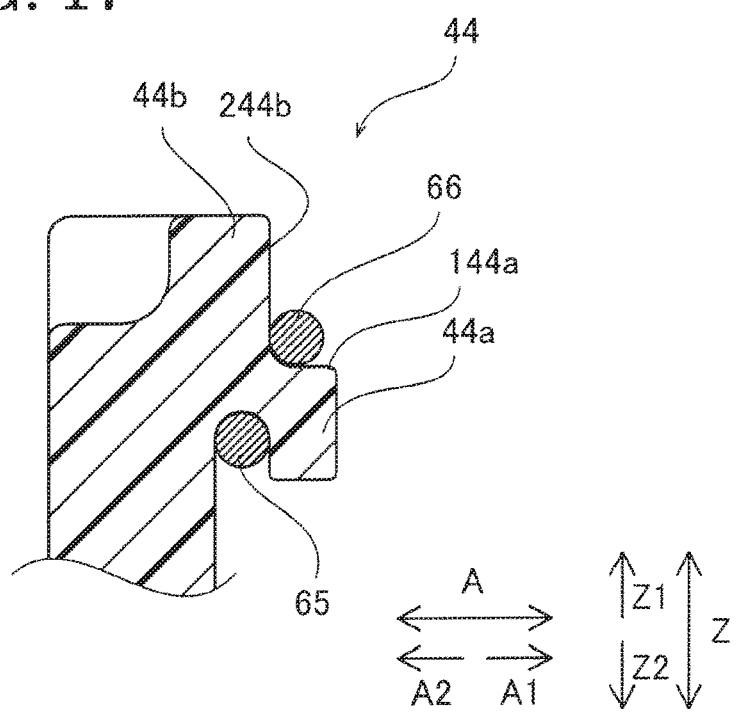
FIG. 17 is a cross-sectional view taken along a line XVII-XVII in FIG. 16.

Specifically, the first hook portion 44*a* is disposed between the two flange portions 42*a*, i.e., a first flange portion 142*a* and a second flange portion 242*a*, in the circumferential direction. As illustrated in FIG. 17, the first hook portion 44*a* is formed in a U-shape (hook shape) opening to the axially lower side (Z2 direction) and radially outer side (arrow A1 side).

As illustrated in FIG. 16, the first common phase crossover wire portion 65 is arranged over an upper surface of the first flange portion 142*a*, the axially lower side of the first hook portion 44*a* and the axially upper side of the wire joint portion 73 in the hook form of the power terminal 71 so that the height position of the first common phase crossover wire portion 65 is restricted. The hook portion 44*a* is in contact with the first common phase crossover wire portion 65 as illustrated in FIG. 17 so that not only the height position but also a position in the radial direction (i.e., arrow A1 and A2 directions) of the first common phase crossover wire portion 65 is restricted.

The common phase crossover wire portions 61 also include a second common phase crossover wire portion 66 (for example, the U-phase crossover wire portion 61*a*, the V-phase crossover wire portion 61*c* or the W-phase crossover wire portion 61*f*) connected to the power terminal 71 (power terminal 71*a*, 71*c* or 71*f*) for another one of the phases of the three-phase voltage and disposed from one of the teeth 22 (see FIG. 13) to the second flange portion 242*a*. The crossover wire restriction portion 44 includes a restriction portion 44*b* restricting a height position of the second common phase crossover wire portion 66 in a state where the first common phase crossover wire portion 65 and the second common phase crossover wire portion 66 are separated from each other in the radial direction.

Specifically, the restriction portion 44*b* includes a protruding portion 44*c* protruding to the axially upper side (Z1 side) from the first hook portion 44*a* and to one side in the circumferential direction (i.e., towards the first flange portion 142*a*). The second common phase crossover wire portion 66 disposed to the radially outer side from one of the teeth 22 is arranged along a circumferential one side surface 144*b* of the restriction portion 44*b* at the axially lower side of the protruding portion 44*c*. As illustrated in FIG. 17, the second common phase crossover wire portion 66 is arranged, making contact with an axially upper side of an upper surface 144*a* of the first hook portion 44*a* and extending along a radially outer surface 244*b* of the restriction portion 44*b*. As a result, the second common phase crossover wire portion 66 is disposed at the radially outer side than the first common phase crossover wire portion 65 and at the height position at the axially upper side than the first common phase crossover wire portion 65. As illustrated in FIG. 16, the second common phase crossover wire portion 66 is disposed at the second flange portion 242*a* accordingly.

As illustrated in FIG. 13, the crossover wire arrangement portion 42 includes a guide portion 42*b* at which the common phase crossover wire portion 61 disposed from the power terminal 71 to one of the teeth 22 is arranged. The guide portion 42*b* is provided so as to protrude to the axially upper side from the flange portion 42*a*. The common phase crossover wire portion 61 is disposed from the wire joint portion 73 of the power terminal 71 to one of the teeth 22 via the guide portion 42*b*, i.e., while making contact with a surface of the guide portion 42*b*.

[Construction of Bus Bar]

Figure 18:
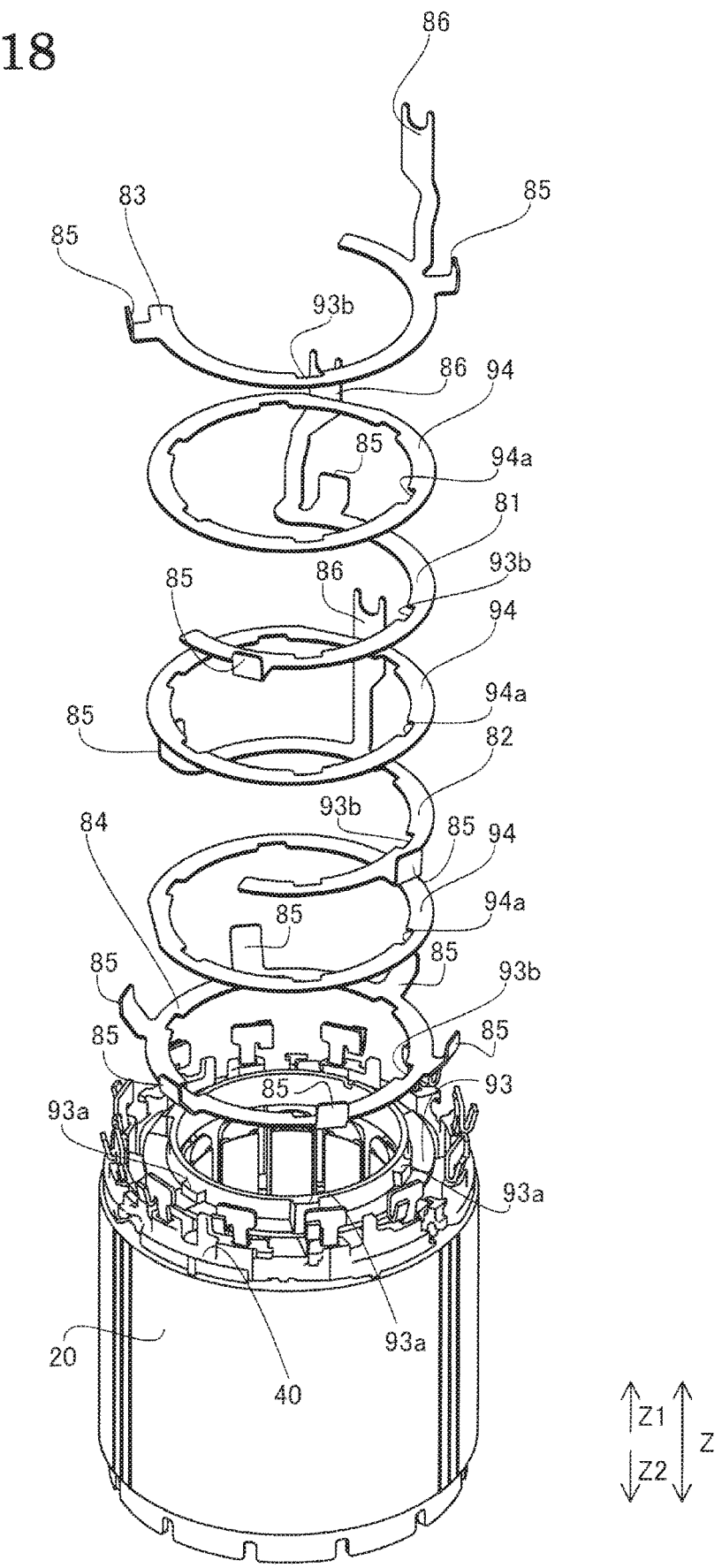
FIG. 18 is an exploded perspective view of the motor according to the second embodiment.

As illustrated in FIG. 18, the motor 100 includes a base portion 93 which is arranged at the axially upper side of the insulator 40 and which includes an annular configuration, and three insulation members 94 disposed between the power bus bars 81 to 83, respectively, in the axial direction. The base portion 93 serves as an example of the bus bar holder.

Specifically, the base portion 93 is made of resin, for example, including insulation properties. The base portion 93 is arranged at the axially upper side of the position at which the teeth 22 of the stator core 20 are provided and at the upper side of the insulator 40 at which the windings 50 are wound.

Each of the power bus bars 81 to 83 is formed in a thin plate and an arc form. The neutral point bus bar 84 is formed in a thin plate and an annular form.

The insulation members 94 are made of resin, for example, and are arranged between the neutral point bus bar 84, the power bus bars 81, 82 and 83, respectively, in the axial direction so as to insulate therebetween. The base portion 93, the neutral point bus bar 84, the insulation member 94, the power bus bar 82, the insulation member 94, the power bus bar 81, the insulation member 94 and the power bus bar 83 are assembled in the mentioned order from a lower side in the axial direction.

The base portion 93 includes base engagement portions 93*a* each of which is in a protruding form. The base engagement portions 93*a* are configured to engage with bus bar engagement portions 93*b*, each of which is in a recess form, provided at the power bus bars 81 to 83 and with the insulation engagement portions 94*a*, each of which is in a recess form, provided at the insulation members 94. Consequently, positions of the neutral point bus bar 84, the power bus bars 81 to 83 in the circumferential direction are restricted. The base engagement portion 93*a* serves as an example of the holder engagement portion.

Each of the power bus bars 81 to 83 formed in a thin plate is bent to the axially upper side to obtain the two bus bar terminals 85. As illustrated in FIG. 12, the two bus bar terminals 85 are provided to make contact with radially inner side surfaces of the corresponding power terminals 71. The two bus bar terminals 85 are configured to join by welding to the corresponding power terminals 71. For example, the bus bar terminals 85 are configured to join to the U-phase power terminals 71a and 71b.

As illustrated in FIG. 18, the power supply terminal 86 connected to the external connection terminal 13 (see FIG. 1) is provided at each of the power bus bars 81 to 83. Each of the power bus bars 81 to 83 is therefore configured to transmit an electric power from the external connection terminal 13 to the windings 50.

The neutral point bus bar 84 formed in a thin plate is bent to the axially upper side so as to obtain the six bus bar terminals 85. The six bus bar terminals 85 are configured to join by welding to the respective neutral point terminals 72.

According to the second embodiment, the winding start portion 54 of one of the windings 50 and the winding end portion 55 of another one of the windings 50 may be connected to the common power terminal 71 (or the neutral point terminal 72) so that the number of the power terminals 71 (or the neutral point terminals 72) for the single winding 50 (specifically, winding 50 wound at each of the teeth 22) is one (i.e., the single power terminal 71 (or the neutral point terminals 72) may be provided for the single winding 50 (tooth 22)). Accordingly, as compared to a case where the two terminal members (the terminal members corresponding to the power terminal and the neutral point terminal) are provided for the single winding, the number of the power terminals 71 and the neutral point terminals 72 may decrease by half. In addition, because of the decrease of the number of the power terminals 71 and the neutral point terminals 72 by half, the number of welding for connecting the windings 50 to the power terminals 71 and the neutral point terminals 72 may decrease by half. As a result, the number of the power terminals 71 and the neutral point terminals 72 decreases by half and the number of manufacturing processes of the motor 100 may decrease.

In the second embodiment, even in a case where the two windings 50 for the common phase are wound at the teeth 22 which are away from each other, the common phase crossover wire portion 61 is disposed at the crossover wire arrangement portion 42 so as to connect the aforementioned two windings 50. The crossover wire arrangement portion 42 is provided at the insulator 40, so that an exclusive member for arranging the common phase crossover wire portion 61 is not necessary, which restrains the increase of the number of components.

In the second embodiment, even in a case where the height position of the crossover wire arrangement portion 42 and the height position of the power terminal 71 are different from each other, the height position of the first common phase crossover wire portion 65 may be restricted to a predetermined height position by the first hook portion 44a.

In the second embodiment, the first common phase crossover wire portion 65 and the second common phase crossover wire portion 66 in which different phase voltages are induced are arranged separating from each other. Thus, interference or short-circuit may be restrained from occurring between the first common phase crossover wire portion 65 and the second common phase crossover wire portion 66.

In the second embodiment, the number of welding for connecting the power terminals 71 to the power bus bars 81 to 83 may decrease by half as compared to a case where the two power terminals 71 are provided for the single winding 50. As a result, the number of manufacturing processes may decrease.

In the second embodiment, the winding start portion 54 of one of the windings 50 and the winding end portion 55 of another one of the windings 50 are connected to the common neutral point terminal 72. Thus, as compared to a case where the neutral point terminal 72 is provided at either the winding start portion 54 or the winding end portion 55 of each of the windings 50, the number of the neutral point terminals 72 may decrease by half.

In the second embodiment, the common phase crossover wire portion 61 and the different phase crossover wire portion 62 are continuously formed to the winding 50 after the winding 50 is wound at each of the teeth 22. Thus, being different from a case where the winding 50, the common phase crossover wire portion 61 and the different phase crossover wire portion 62 are obtained by connection of separate wires from one another, the number of components and the number of manufacturing processes are restrained from increasing.

In the second embodiment, being different from a case where the power terminal 71 (or the neutral point terminal 72) is arranged away from the crossover wire arrangement portion 42, the crossover wire arrangement portion 42 and the power terminal 71 may be easily connected to each other. In addition, because the terminal attachment portion 43 is provided at the insulator 40, an exclusive member for mounting the power terminal 71 (or the neutral point terminal 72) to the motor 100 is not necessary, which restrains the number of components from increasing.

In the second embodiment, all the windings 50, the common phase crossover wire portions 61 and the different phase crossover wire portions 62 are obtainable by the two wires corresponding to the first wire 63 and the second wire 64. That is, all the windings 50, the common phase crossover wire portions 61 and the different phase crossover wire portions 62 are obtainable by two times of wiring (winding) process. Thus, as compared to a case where the windings 50, the common phase crossover wire portions 61 and the different phase crossover wire portions 62 are obtained by three or more than three wires, for example, the number of manufacturing processes may be effectively restrained.

The second embodiment is not limited to have the aforementioned construction and may be appropriately modified or changed.

For example, in the second embodiment, the motor 100 is constructed as an 8-pole 12-slot motor. Alternatively, the motor 100 may be constructed to include the number of poles other than eight and to include the number of slots other than twelve.

In the second embodiment, the insulator 40 is provided at the motor 100. Alternatively, the insulator 40 may not be provided at the motor 100. Then, the windings 50 may be directly wound at the stator core 20.

In the second embodiment, the crossover wire arrangement portion 42 is integrally provided at the insulator 40. Alternatively, the crossover wire arrangement portion 42 may be provided as a separate member from the insulator 40.

In the second embodiment, the windings 50, the common phase crossover wire portions 61 and the different phase crossover wire portions 62 are obtained by the continuously formed first wire 63 (or the second wire 64). Alternatively, the windings 50, the common phase crossover wire portions 61 and the different phase crossover wire portions 62 may be obtained by separate wires from one another.

In the second embodiment, the power bus bar 81 serves as the U-phase bus bar. Then, the power bus bar 82 serves as the V-phase bus bar while the power bus bar 83 serves as the W-phase bus bar. Alternatively, the power bus bar 81 may serve as the V-phase bus bar or the W-phase bus bar, for example.

The following construction may be also obtainable in the motor 100 serving as the rotary electric machine according to the second embodiment.

In the rotary electric machine including the aforementioned insulator, the insulator may include the terminal attachment portion which is provided in the vicinity of the crossover wire arrangement portion and at which the terminal member is attachable.

According to the aforementioned construction, being different from a case where the terminal member is arranged apart from the crossover wire arrangement portion, the crossover wire arrangement portion and the terminal member may be easily connected. In addition, because the terminal attachment portion is provided at the insulator, an exclusive member for attaching the terminal member at the motor is not necessary, which restrains the number of components from increasing.

In addition, in the rotary electric machine where the aforementioned crossover wire portions and the windings are obtained by the continuous wire, the plural teeth are constituted by the first teeth group including the teeth and the second teeth group including the teeth other than those of the first teeth group. The wire may include the first wire wound at the first teeth group to obtain the windings and the crossover wire portions and the second wire wound at the second teeth group to obtain the windings and the crossover wire portions.

According to the aforementioned construction, all the windings wound at the plural teeth and the crossover wire portions are achieved by the two wires, i.e., the first wire and the second wire, so that all the windings and the crossover wire portions may be obtained by two times of wiring (winding) process. Therefore, as compared to a case where the windings and the crossover wire portions are obtained by three or more than three wires, the increase of the number of manufacturing processes may be effectively restrained.

According to the first embodiment, the base engagement portion 91 includes the plural protrusions which include different heights from one another in the rotation axis direction of the rotor core 30. At least one of the plural protrusions is configured to be inhibited from protruding in the rotation axis direction by engaging with the bus bar engagement portion 73b provided at least at one of the plural bus bars 81-84.

According to the first embodiment, the plural protrusions include the base engagement portions 91a, 91b and 91c, the plural bus bars 81-84 including the first phase bus bar 82 which includes the bus bar engagement portion 732b, the second phase bus bar 81 which includes the bus bar engagement portion 731b and the third phase bus bar 83 which includes the bus bar engagement portion 733b. The base engagement portion 91a is inhibited from protruding from the first phase bus bar 82 in a state where the base engagement portion 91a and the bus bar engagement portion 732b engage with each other. The base engagement portion 91b is inhibited from protruding from the second phase bus bar 81 in a state where the base engagement portion 91b and the bus bar engagement portion 731b engage with each other. The base engagement portion 91c is inhibited from protruding from the third phase bus bar 83 in a state where the base engagement portion 91c and the bus bar engagement portion 733b engage with each other.

According to the first embodiment, the height of the base engagement portion 91c in the rotation axis direction is greater than the height of the base engagement portion 91b in the rotation axis direction while the height of the base engagement portion 91b in the rotation axis direction is greater than the height of the base engagement portion 91a in the rotation axis direction. The first phase bus bar 82, the second phase bus bar 81 and the third phase bus bar 83 are configured to be placed in order from the lower side in the rotation axis direction at the upper portion of the base portion 90.

According to the first embodiment, the bus bar engagement portion 732b includes the plural bus bar engagement portions and the bus bar engagement portion 731b includes the plural bus bar engagement portions. The number of the plural bus bar engagement portions 732b is greater than the number of the plural bus bar engagement portions 731b, and the number of the plural bus bar engagement portions 731b is greater than the number of the bus bar engagement portion 733b.

According to the first embodiment, the base portion 90 includes the phase bus bar non-engagement protrusions (base engagement portions) 91d and 91e which are inhibited from engaging with any one of the power bus bars 82, 81 and 83. Each of the power bus bars 82, 81 and 83 is formed in an arc form. In a state where the base engagement portions 91a, 91b and 91c engage with the bus bar engagement portions 732b, 731b and 733b, respectively, the height of the phase bus bar non-engagement protrusion 91d, 91e in the rotation axis direction is specified to be greater than the height of the lower end surface 82b, 83b of at least one of the power bus bars 82, 81 and 83 in the axial direction.

According to the second embodiment, the motor 100 further includes the insulator 40 provided to cover the plural teeth 22 to insulate between the stator core 20 and the plural windings 50. The terminal member includes the power connection terminal 71. The crossover wire portion includes the common phase crossover wire portion 61 which is connected to the power connection terminal 71 to connect between the two windings in the plural windings 50, the two windings serving as the same phase windings. The insulator 40 includes the crossover wire arrangement portion 42 at the outer circumferential side of the stator core 20 when viewed in the axial direction so that the common phase crossover wire portion 61 is arranged at the crossover wire arrangement portion 42.

According to the second embodiment, the crossover wire arrangement portion 42 includes the flange portion 42a which is provided at the outer circumferential portion of the insulator 40 and which is disposed at a lower side in the axial direction than the terminal member (the power terminal, the neutral point terminal) 71, 72. The common phase crossover wire portion 61 includes the first common phase crossover wire portion 65 disposed from the flange portion 42a to the power connection terminal 71 for one phase of the three-phase voltage. The insulator 40 includes the restriction portion 44 arranged at the height position between the flange portion 42a and the power connection terminal 71 to restrict the height position of the first common phase crossover wire portion 65.

According to the second embodiment, the common phase crossover wire portion 61 includes the second common phase crossover wire portion 66 connected to the power connection terminal 71 for the other phase of the three-phase voltage disposed from one of the teeth 22 to the flange portion 42a. The insulator 40 includes the restriction portion 44 restricting the height position of the second common phase crossover wire portion 66 in a state where the first common phase crossover wire portion 65 and the second common phase crossover wire portion 66 are separated from each other in the radial direction of the rotor core 30.

According to the second embodiment, the plural windings 50 include the four windings serving as the same phase windings. The crossover wire portion includes the two common phase crossover wire portions 61 each of which connects between the two windings in the four windings 50 serving as the same phase windings. The power connection terminal includes the two power connection terminals 71 provided corresponding to the two common phase crossover wire portions 61. The motor 100 further includes the bus bars 81-84 each of which is connected to the two power connection terminals 71 and to the external terminal 13.

The terminal member includes the neutral point connection terminal 72. The crossover wire portion (different phase crossover wire portion) 62 is configured to connect the winding start portion 54 of one of the plural windings 50 and the winding end portion 55 of another one of the plural windings 50, one of the plural windings 50 and another one of the plural windings 50 serving as the different phase windings from each other, one of the plural windings 50 being wound at one of the teeth 22 adjacent to another one of the teeth 22 at which another one of the plural windings 50 is wound, the crossover wire portion 62 being connected to the neutral point connection terminal 72.

According to the second embodiment, the crossover wire portions 61, 62 and the windings 50 are obtained by the continuous wire 63, 64.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A rotary electric machine comprising:
a rotor core fixed at a rotation axis;
a stator core arranged facing the rotor core and including a plurality of teeth;
a plurality of windings wound at the plurality of teeth of the stator core;
a plurality of winding connection terminals connected to respective ends of the plurality of windings;
a plurality of bus bars connected to the plurality of winding connection terminals, each of the plurality of bus bars being formed in either an arc form or an annular form; and
a bus bar holder holding the plurality of bus bars in a laminated state and including a holder engagement portion engaging with a bus bar engagement portion which is provided at least at one of the plurality of bus bars;
wherein the holder engagement portion includes a plurality of protrusions which include different heights from one another in a rotation axis direction of the rotor core,
at least one of the plurality of protrusions is configured to be inhibited from protruding in the rotation axis direction by engaging with the bus bar engagement portion provided at least at one of the plurality of bus bars,
the plurality of protrusions includes a first protrusion, a second protrusion and a third protrusion, the plurality of bus bars including a first phase bus bar which includes a first recess, a second phase bus bar which includes a second recess and a third phase bus bar which includes a third recess, and
the first protrusion is inhibited from protruding from the first phase bus bar in a state where the first protrusion and the first recess engage with each other, the second protrusion is inhibited from protruding from the second phase bus bar in a state where the second protrusion and the second recess engage with each other, the third protrusion is inhibited from protruding from the third phase bus bar in a state where the third protrusion and the third recess engage with each other.

2. The rotary electric machine according to claim 1, wherein the bus bar holder includes a phase bus bar non-engagement protrusion which is inhibited from engaging with any one of the first phase bus bar, the second phase bus bar and the third phase bus bar,
each of the first phase bus bar, the second phase bus bar and the third phase bus bar is formed in an arc form,
in a state where the first protrusion, the second protrusion and the third protrusion engage with the first recess portion, the second recess portion and the third recess portion, respectively, a height of the phase bus bar non-engagement protrusion in the rotation axis direction is specified to be greater than a height of a lower end surface of at least one of the first phase bus bar, the second phase bus bar and the third phase bus bar in the axial direction.

3. The rotary electric machine according to claim 1, wherein the first recess includes a plurality of first recesses and the second recess includes a plurality of second recesses,
number of the plurality of first recesses is greater than number of the plurality of second recesses, and the number of the plurality of second recesses is greater than number of the third recess.

4. The rotary electric machine according to claim 3, wherein the bus bar holder includes a phase bus bar non-engagement protrusion which is inhibited from engaging with any one of the first phase bus bar, the second phase bus bar and the third phase bus bar,
each of the first phase bus bar, the second phase bus bar and the third phase bus bar is formed in an arc form,
in a state where the first protrusion, the second protrusion and the third protrusion engage with the first recess portion, the second recess portion and the third recess portion, respectively, a height of the phase bus bar non-engagement protrusion in the rotation axis direction is specified to be greater than a height of a lower end surface of at least one of the first phase bus bar, the second phase bus bar and the third phase bus bar in the axial direction.

5. The rotary electric machine according to claim 1, wherein a height of the third protrusion in the rotation axis direction is greater than a height of the second protrusion in the rotation axis direction while the height of the second protrusion in the rotation axis direction is greater than a height of the first protrusion in the rotation axis direction,
the first phase bus bar, the second phase bus bar and the third phase bus bar are configured to be placed in order from a lower side in the rotation axis direction at an upper portion of the bus bar holder.

6. The rotary electric machine according to claim 5, wherein the first recess includes a plurality of first recesses and the second recess includes a plurality of second recesses,
number of the plurality of first recesses is greater than number of the plurality of second recesses, and the number of the plurality of second recesses is greater than number of the third recess.

7. The rotary electric machine according to claim 5, wherein the bus bar holder includes a phase bus bar non-engagement protrusion which is inhibited from engaging with any one of the first phase bus bar, the second phase bus bar and the third phase bus bar, each of the first phase bus bar, the second phase bus bar and the third phase bus bar is formed in an arc form, in a state where the first protrusion, the second protrusion and the third protrusion engage with the first recess portion, the second recess portion and the third recess portion, respectively, a height of the phase bus bar non-engagement protrusion in the rotation axis direction is specified to be greater than a height of a lower end surface of at least one of the first phase bus bar, the second phase bus bar and the third phase bus bar in the axial direction.

* * * * *